(12) United States Patent
Song et al.

(10) Patent No.: US 10,306,072 B2
(45) Date of Patent: May 28, 2019

(54) METHOD AND DEVICE FOR CONTROLLING FURTHER DEVICE IN WIRELESS COMMUNICATION SYSTEM

(71) Applicant: LG ELECTRONICS INC., Seoul (KR)

(72) Inventors: Jonghun Song, Seoul (KR); Taeyoung Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/484,746

(22) Filed: Apr. 11, 2017

(65) Prior Publication Data

US 2017/0295284 A1   Oct. 12, 2017

Related U.S. Application Data

(60) Provisional application No. 62/321,227, filed on Apr. 12, 2016.

(51) Int. Cl.
| | |
|---|---|
| *H04M 11/00* | (2006.01) |
| *H04W 12/08* | (2009.01) |
| *H04W 4/00* | (2018.01) |
| *H04L 12/24* | (2006.01) |
| *H04L 29/06* | (2006.01) |
| *H04W 4/80* | (2018.01) |

(52) U.S. Cl.
CPC ........... *H04M 11/007* (2013.01); *H04L 41/28* (2013.01); *H04L 65/1069* (2013.01); *H04L 65/1073* (2013.01); *H04L 65/4084* (2013.01); *H04W 4/80* (2018.02)

(58) Field of Classification Search
CPC ....... H04M 11/007; H04W 4/80; H04L 41/28; H04L 65/1069; H04L 65/1073; H04L 65/4084
See application file for complete search history.

(56) References Cited

U.S. PATENT DOCUMENTS

| | | | | |
|---|---|---|---|---|
| 6,529,170 B1* | 3/2003 | Nishizawa | ............... | H01Q 1/38 343/700 MS |
| 2003/0188028 A1* | 10/2003 | Kawamura | ........... | H04W 28/06 709/249 |
| 2009/0027286 A1* | 1/2009 | Ohishi | ................. | H01Q 3/2682 343/750 |
| 2014/0273858 A1* | 9/2014 | Panther | ................ | A61B 5/0002 455/41.2 |

(Continued)

*Primary Examiner* — Qun Shen
(74) *Attorney, Agent, or Firm* — Birch, Stewart, Kolasch & Birch, LLP

(57) ABSTRACT

There is provided a method for controlling a first device by a control device using BLE (Bluetooth Low Energy) technology in a wireless communication system, the method comprises establishing a BLE connection with the first device; opening a control channel for controlling the first device; determining the first device and a specific control level to the first device, via the control channel, wherein the specific control level indicates a control authority to control the first device by the control device, wherein the specific control level is determined based on a required security level for the first device; and controlling a controllable operation for the first device based on the determined specific control level, wherein the controllable operation is defined based on the determined specific control level.

8 Claims, 30 Drawing Sheets

(56) References Cited

U.S. PATENT DOCUMENTS

| | | | | |
|---|---|---|---|---|
| 2014/0348327 A1* | 11/2014 | Linde | ................. | H04H 20/88 381/2 |
| 2015/0289077 A1* | 10/2015 | Ko | ................. | H04W 8/22 455/420 |
| 2015/0351145 A1* | 12/2015 | Burks | ................. | G08C 17/02 455/41.3 |

* cited by examiner

[Fig.1]
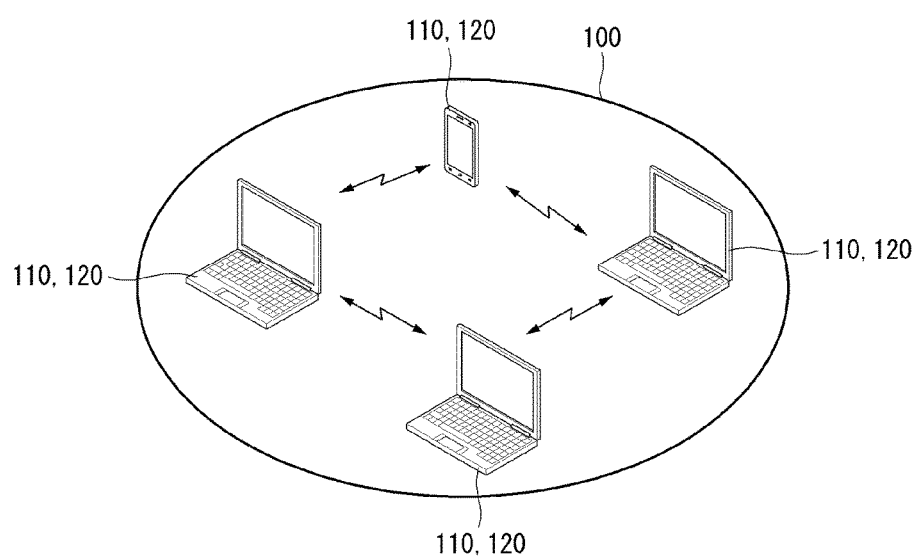

[Fig.2]
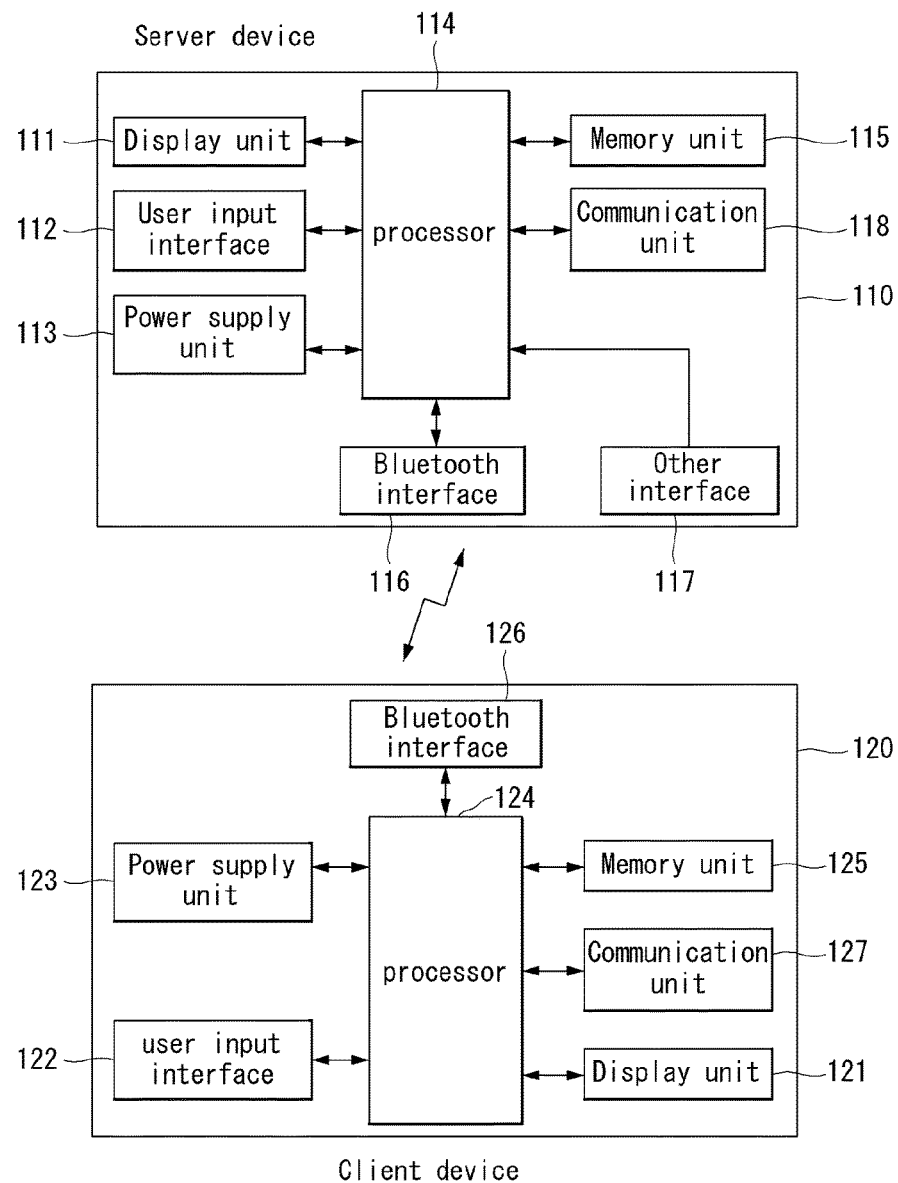

[Fig.3]
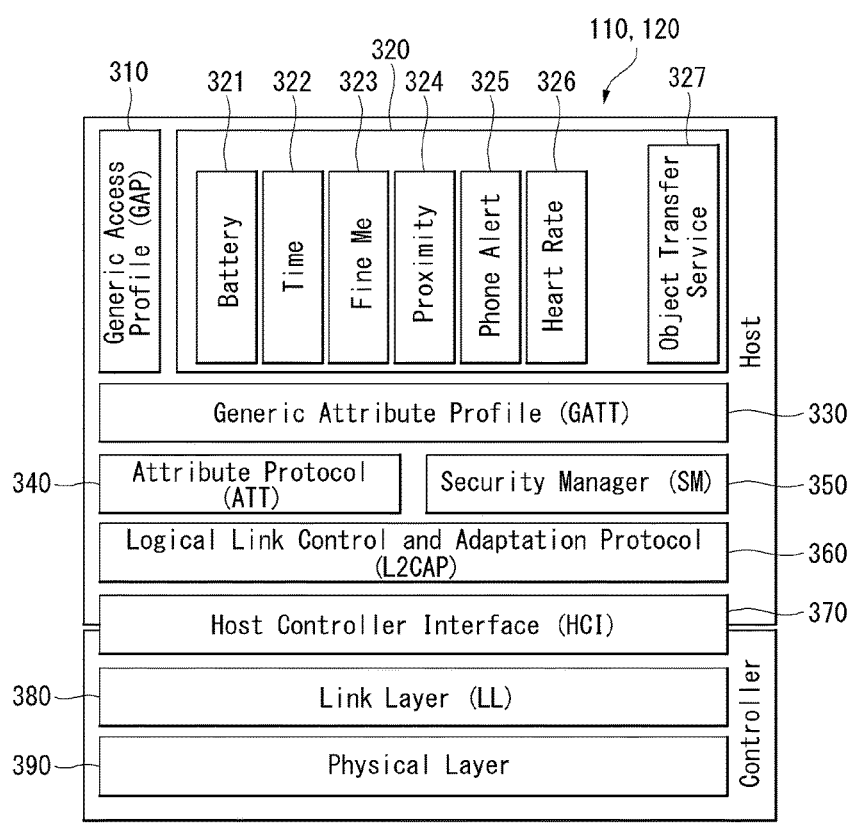

[Fig.4]
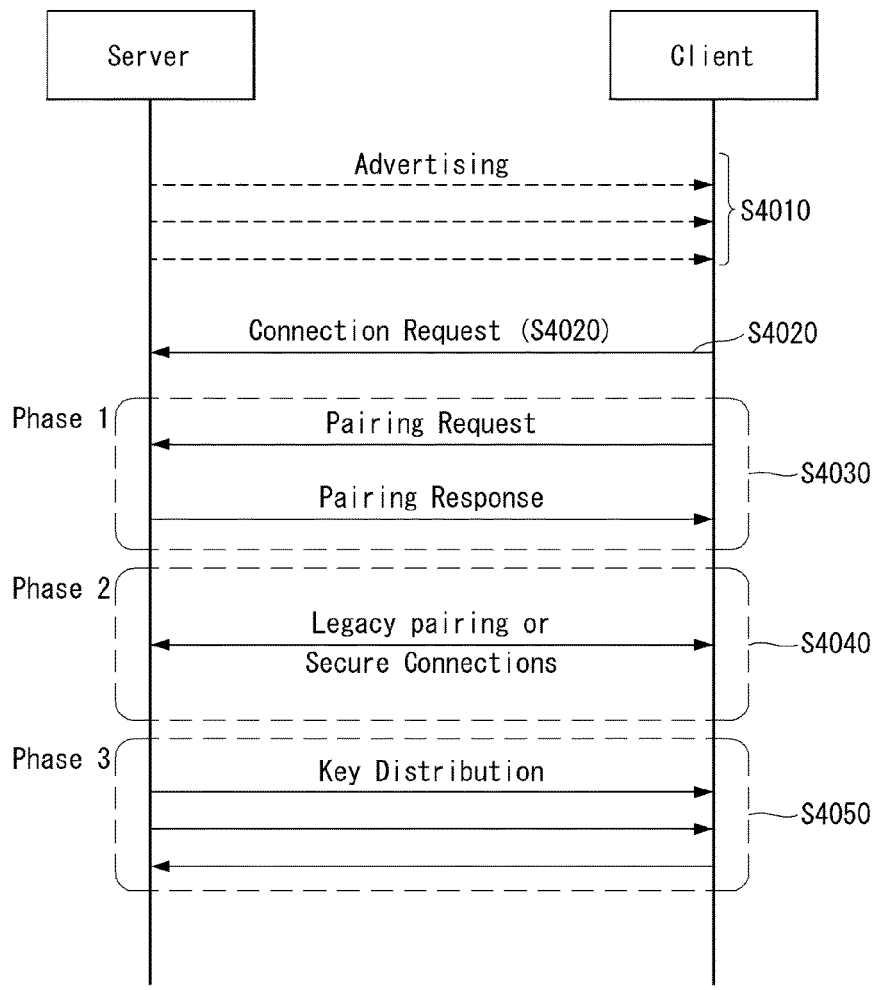

[Fig.5]
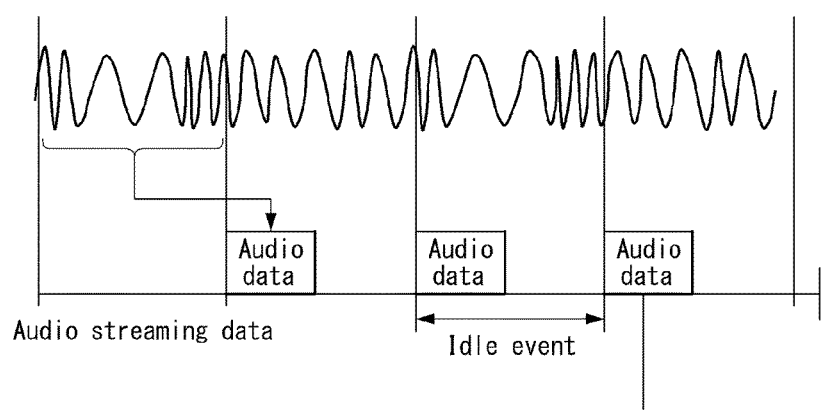

[Fig.6]
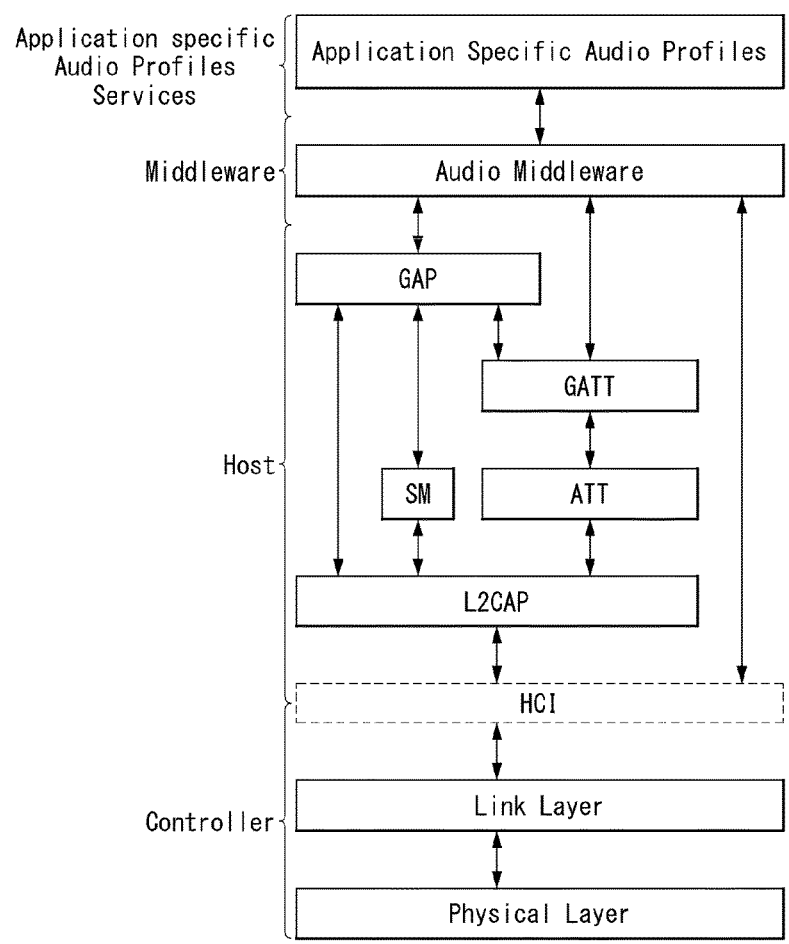

[Fig.7]
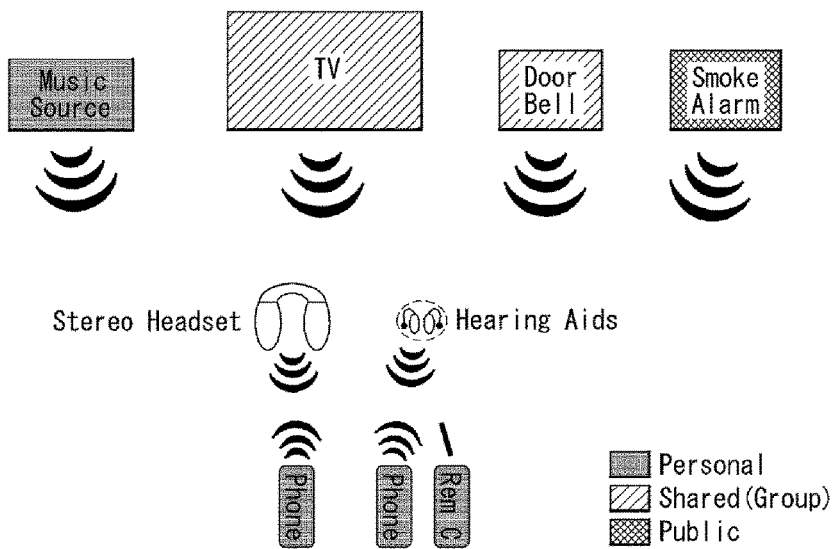

[Fig.8]
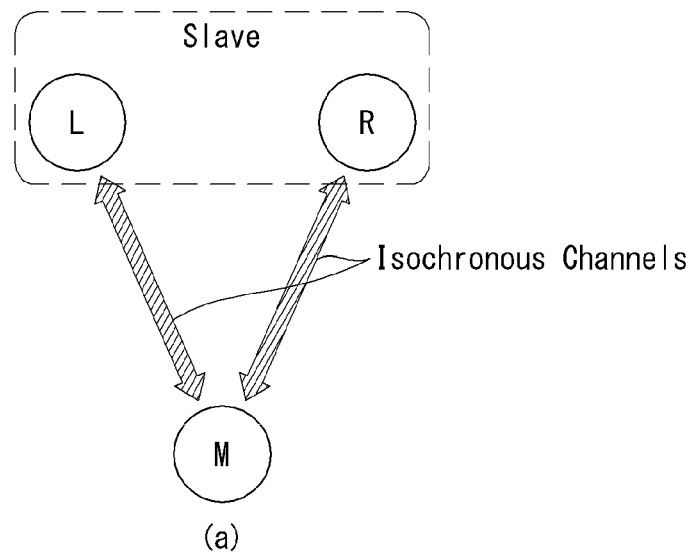
(a)
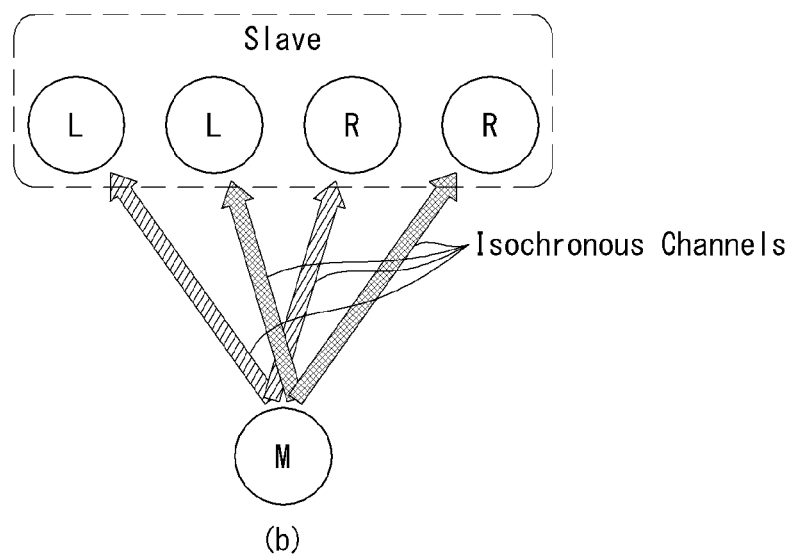
(b)

[Fig.9]
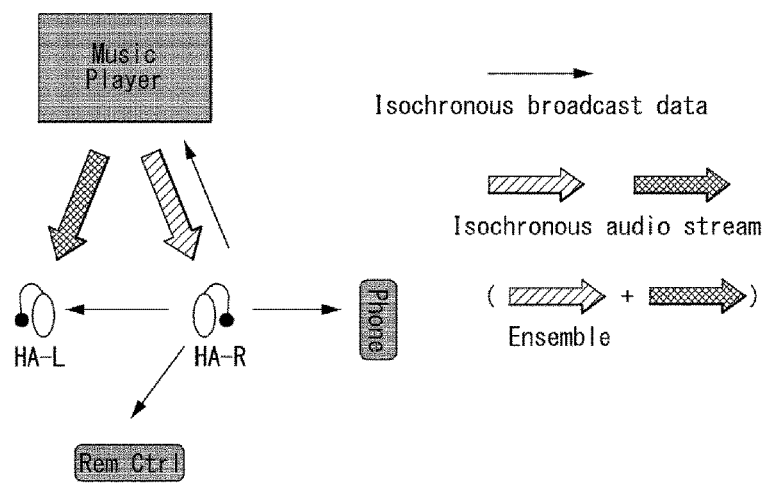

[Fig.10]
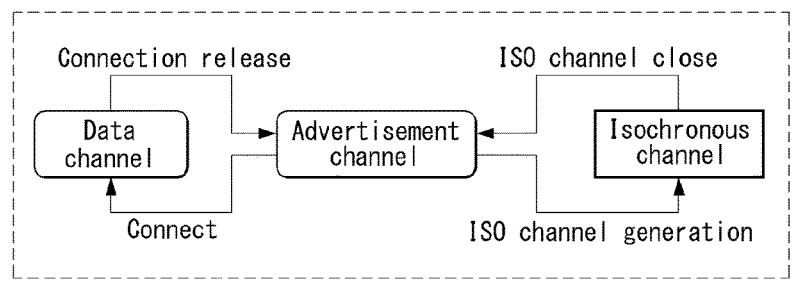

[Fig.11]
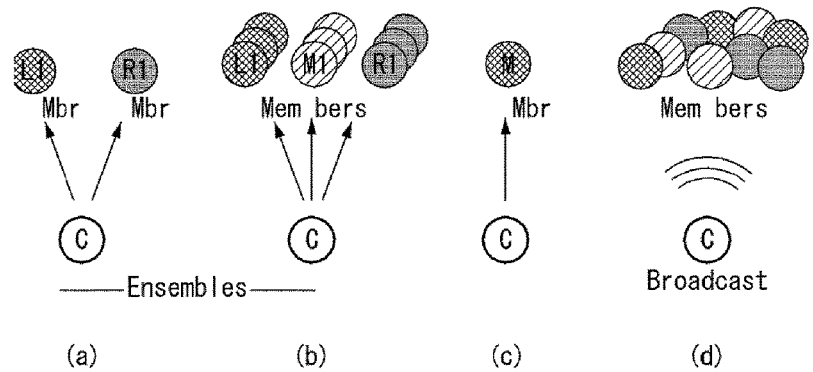

[Fig.12]
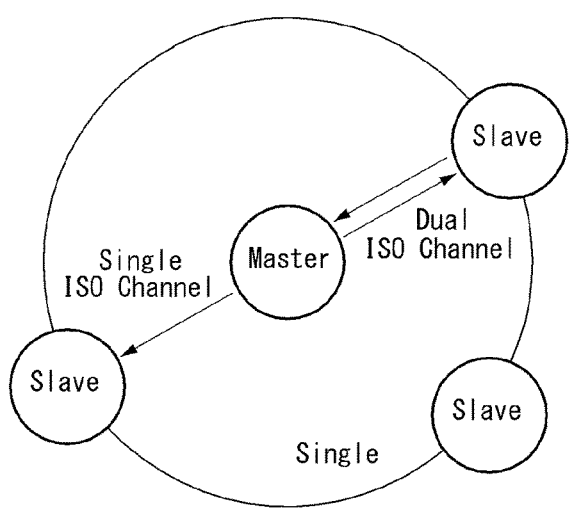

[Fig.13]
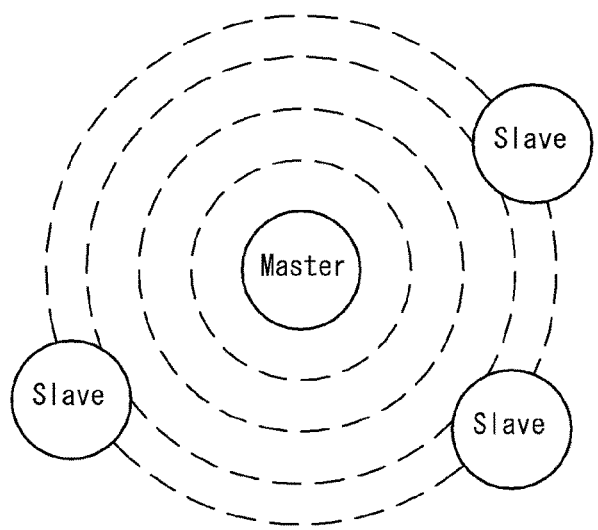

[Fig.14]
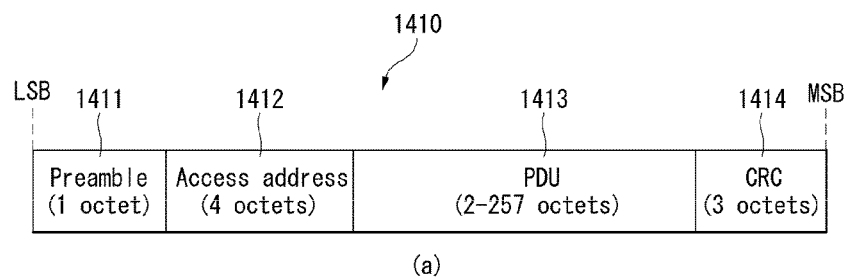
(a)
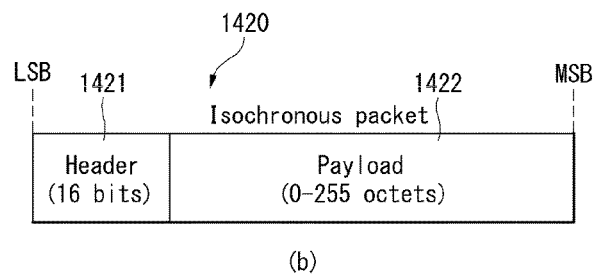
(b)

[Fig.15]

Terminology to Service mapping

| Svc# | entity / channel mapping | Audio Source | Audio Controller | Audio Sink |
|---|---|---|---|---|
| 1 | Audio-A (Advertising, Announcement) | service | client | service |
| 2 | Audio-B (Control, Configuration) | service | client | service |
| 3 | Audio-C (Streaming) | service | – | client |

(a)

Service mapping within Client-Server Architecture

| Svc# | entity / channel mapping | | Audio Source | Audio Controller | Audio Sink |
|---|---|---|---|---|---|
| 1 | Audio Source service | (for Audio-A) | service | client | – |
| 2 | | (for Audio-C) | service | client | – |
| 3 | | (for Audio-S) | service | – | client |
| 4 | Audio Sink service | (for Audio-A) | – | client | service |
| 5 | | (for Audio-C) | – | client | service |
| 6 | | (for Audio-S) | – | – | – |
| 7 | Meta-data service | | service | client | – |
| 8 | Transport Information service | | service | client | service |
| 9 | Cdoec Information service | | service | client | client |
| 10 | Contents Protection service | encryption service | service | client | – |
| 11 | | decryption service | – | client | service |
| 12 | Audio Controller Access service | | service | client | client |
| 13 | Mixing service | | service | client | client |
| 14 | Volume service | | service | client | client |

(b)

[Fig.16]
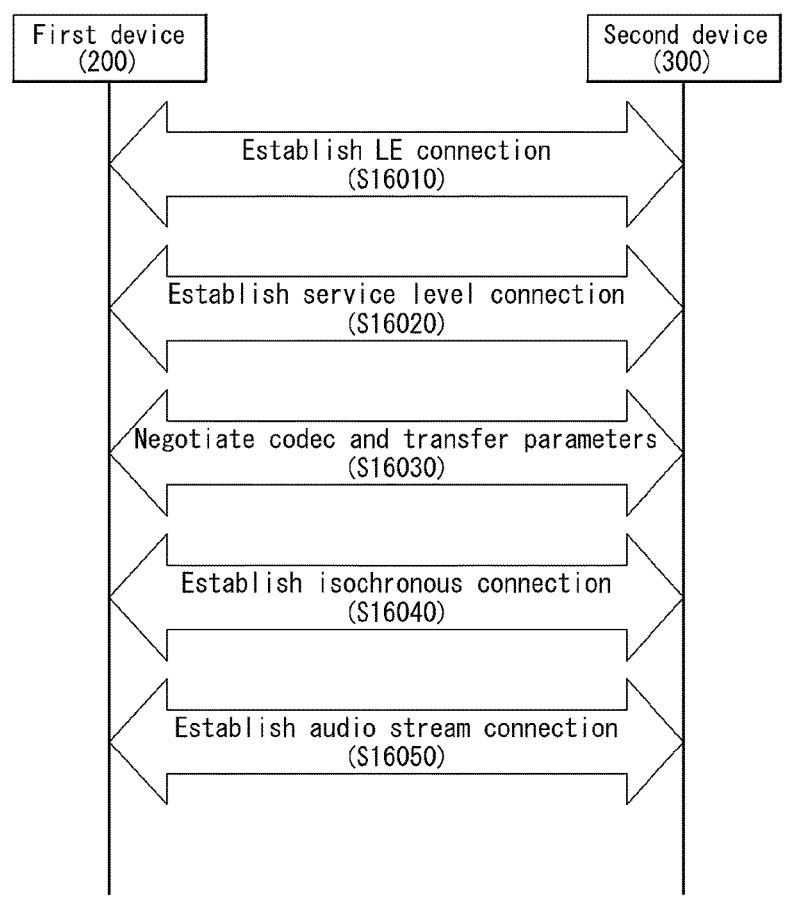

[Fig.17]
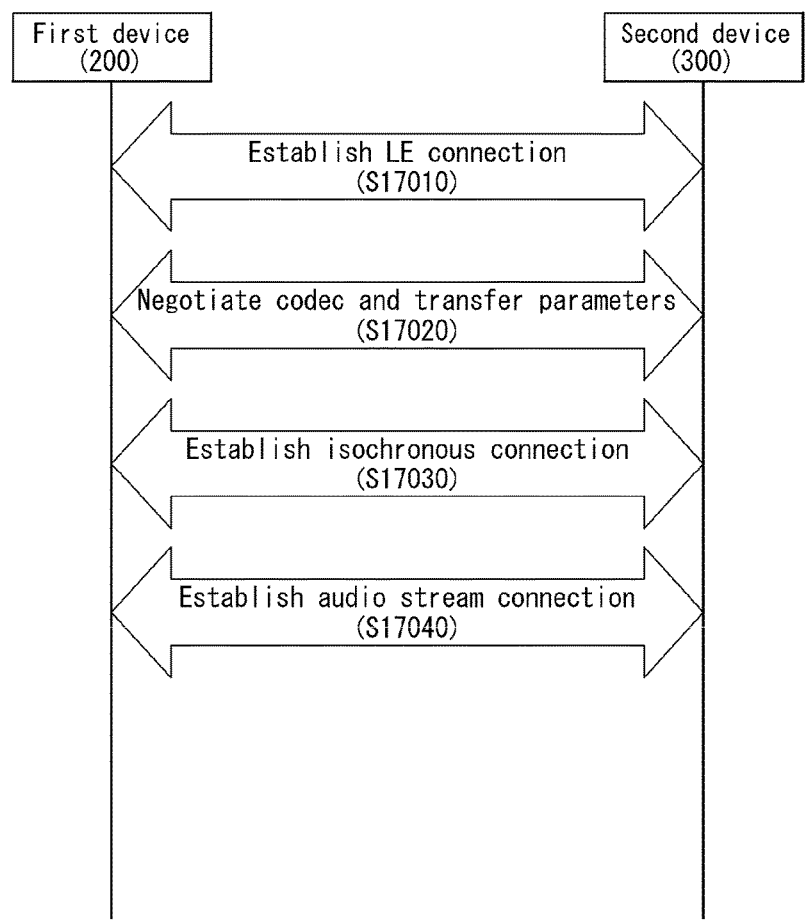

[Fig.18]
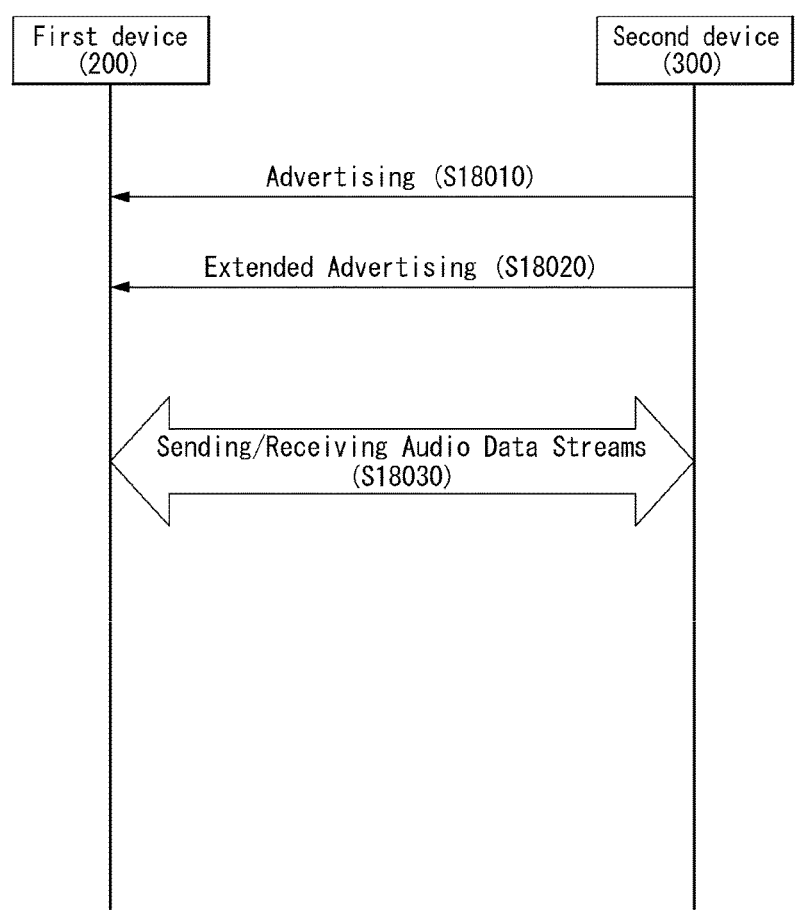

[Fig.19]
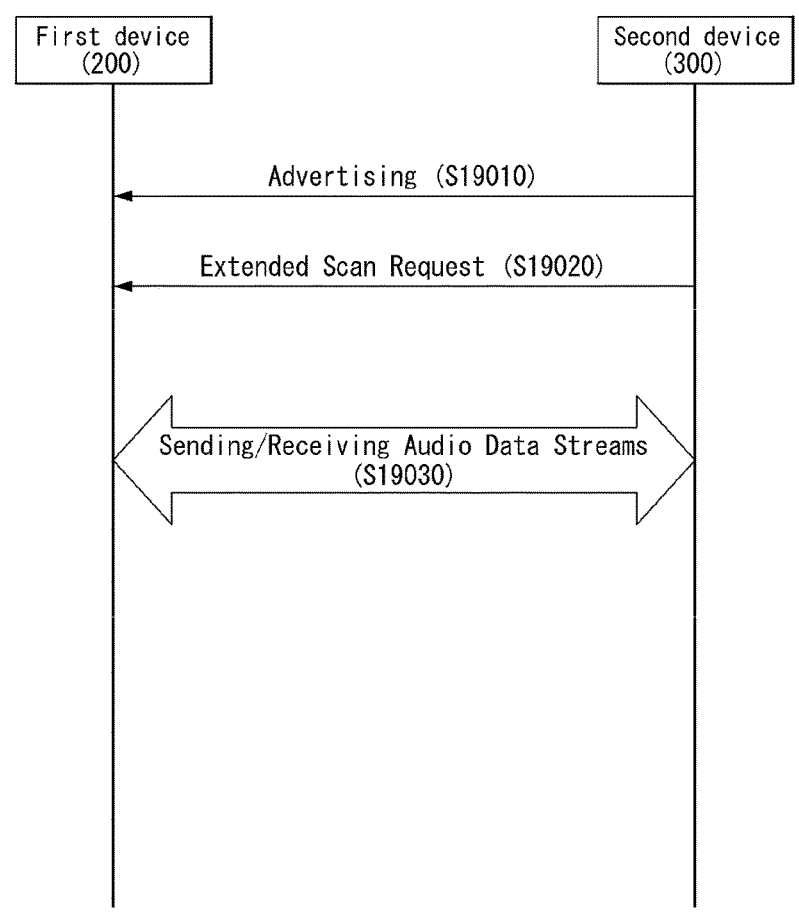

[Fig.20]
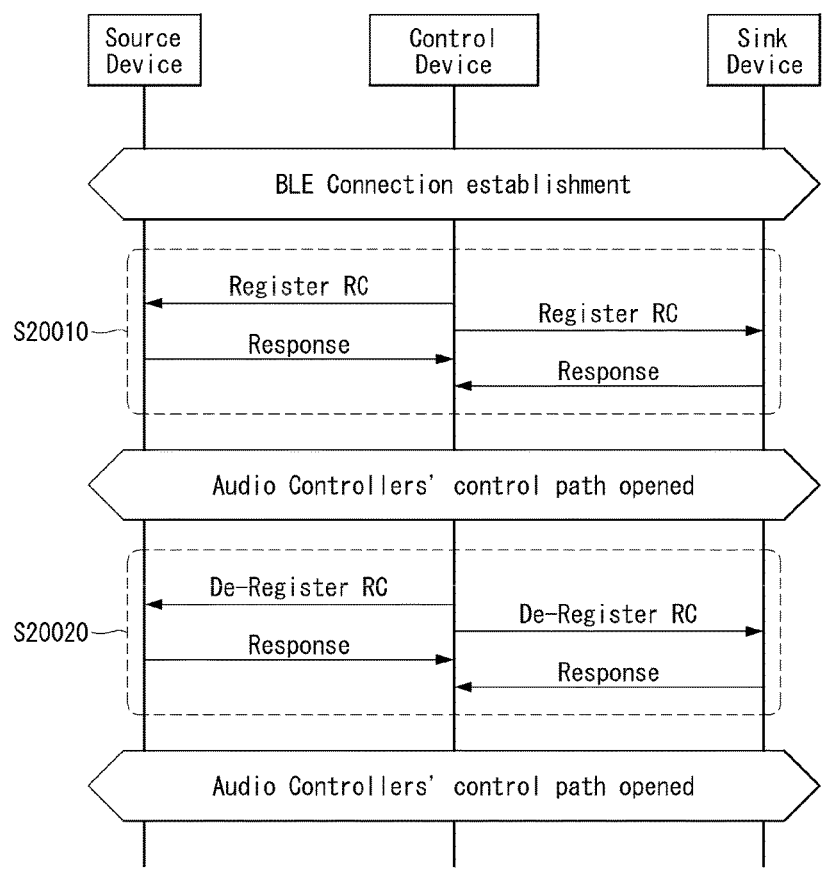

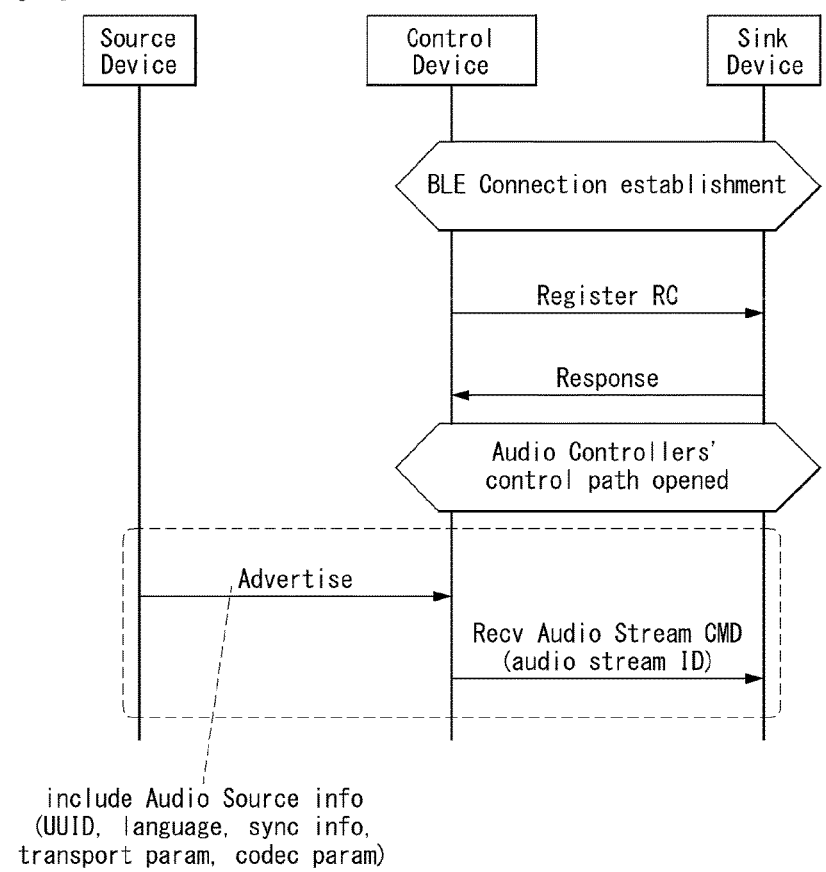

[Fig.22]
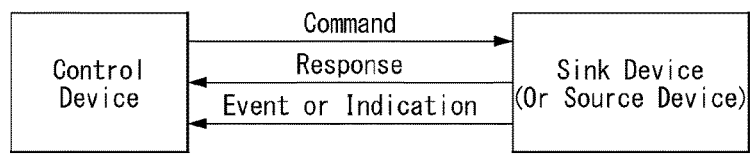

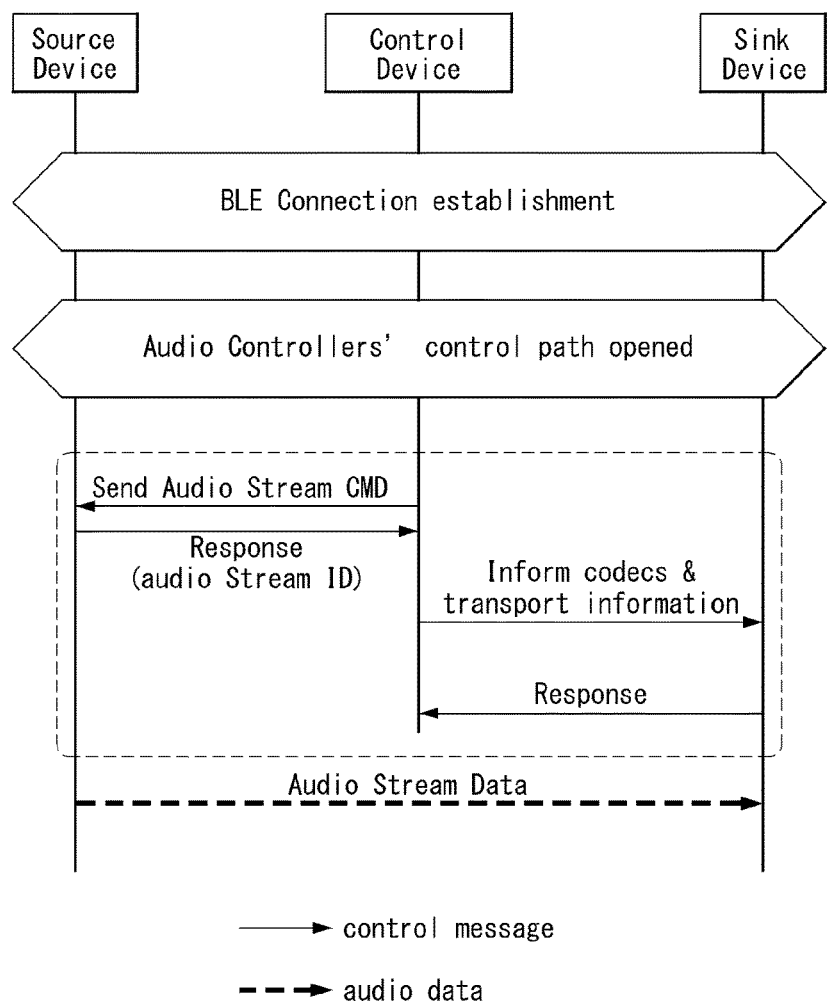

[Fig.24]

| Environment | Required security level | No-priority with remote control |
|---|---|---|
| Personal | No or Low | Works well |
| Shared | No | Works well |
| | High | Security issue may occurred (confidential conf. call, non-free digital contents) |
| Public | No | Works well |

[Fig.25]

| Control Level | Description | Priority | environment |
|---|---|---|---|
| High | AC can enable and disable service. | 1 | Personal or shared |
| Normal | AC can control audio source for listening the music such as start, stop, FF and RW. | 2 | Shared |
| Limited | AC can just pickup the audio stream. AC can't control the audio source. | 3 | Public |

[Fig.26]
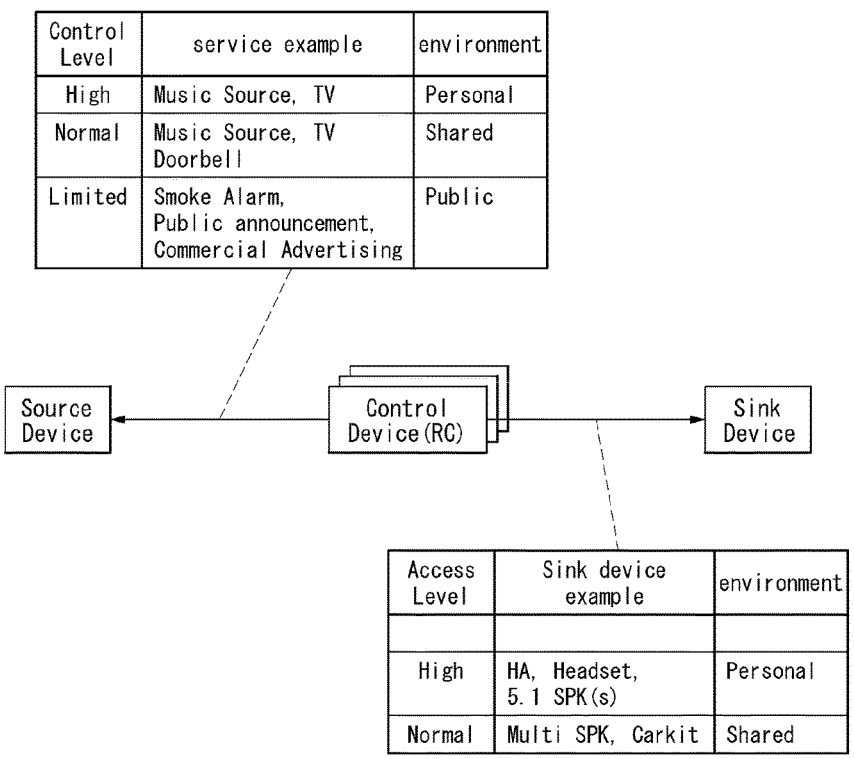

[Fig.27]
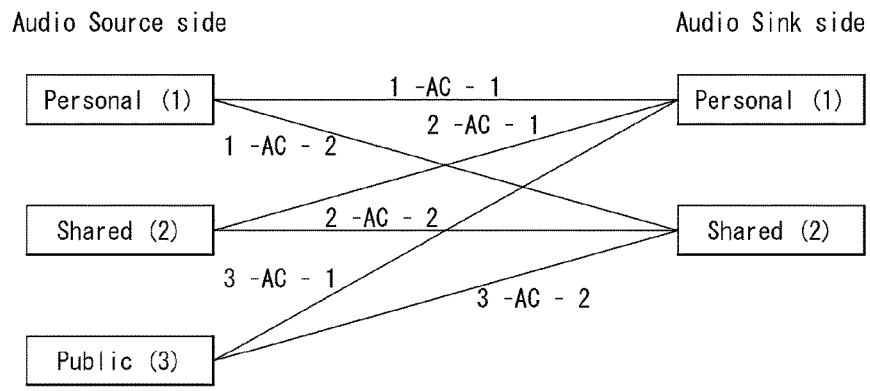

[Fig.28]
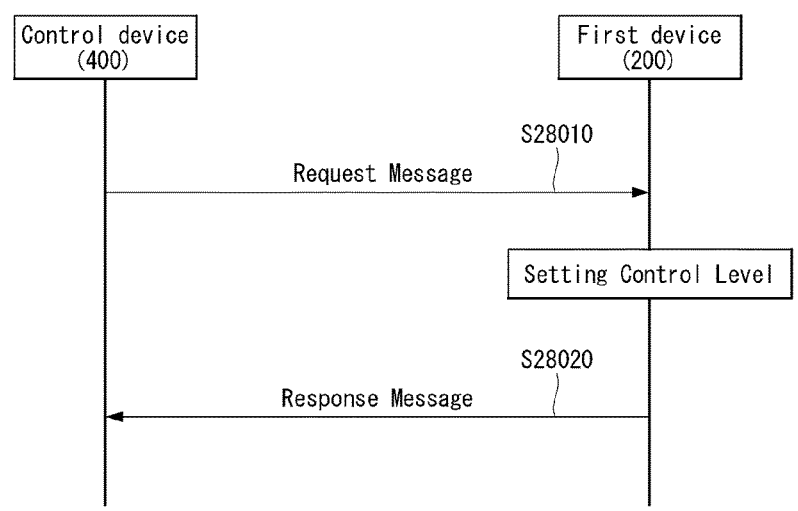

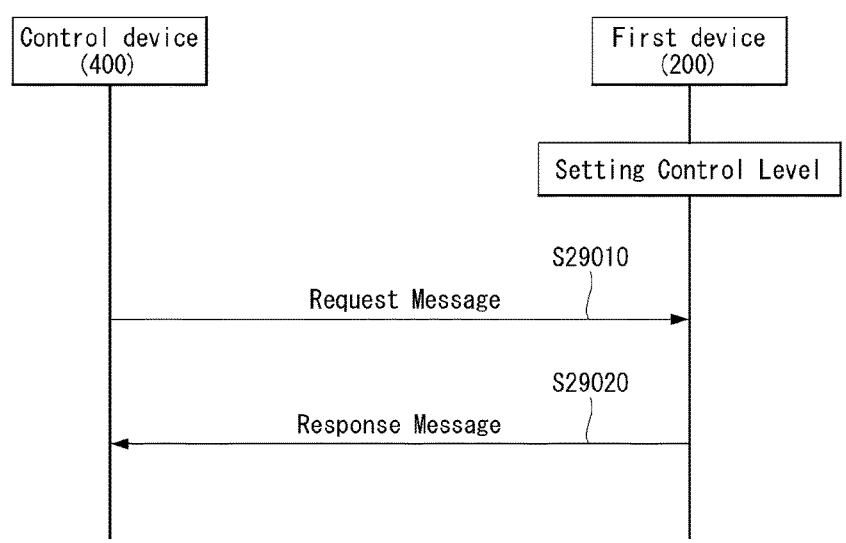
[Fig.29]

[Fig.30]
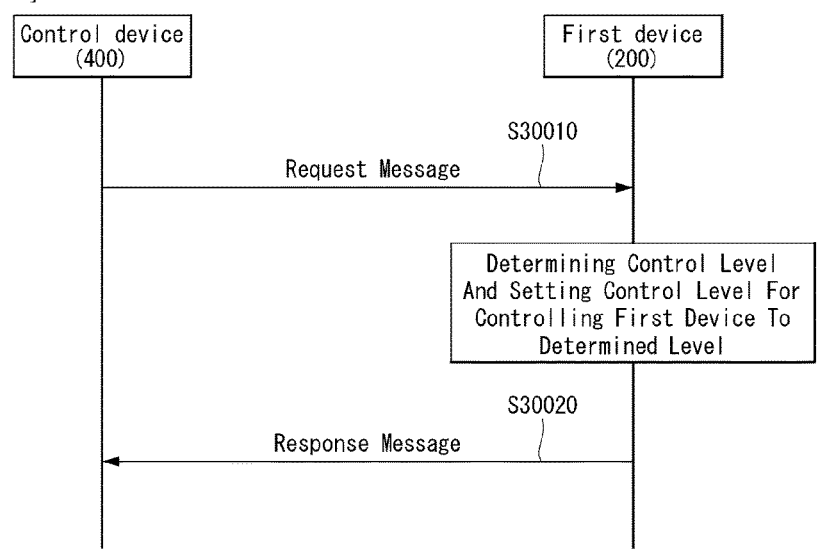

METHOD AND DEVICE FOR CONTROLLING FURTHER DEVICE IN WIRELESS COMMUNICATION SYSTEM

CROSS-REFERENCE TO RELATED APPLICATIONS

This application claims a priority to U.S. Provisional Application No. 62/321,227 filed on 12 Apr. 2016, the entire content of which is hereby incorporated by reference in its entirety.

BACKGROUND OF THE INVENTION

Field of the Invention

The present invention relates to a method and device for controlling a further device using Bluetooth as a short-range technology in a wireless communication system, and more particularly to a method and device for controlling a further device to provide an audio streaming service using Bluetooth Low Energy (BLE) in a wireless communication system.

Related Art

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

SUMMARY OF THE INVENTION

The present invention has an object to provide a method and device for controlling a further device using Bluetooth technology.

It is another object of the present invention to provide a method and device for setting a control level for a control device based on a use environment of a controlled device.

It is also an object of the present invention to provide a method and device for restricting operations controlled by a control device based on a control level for a control device.

It is still another object of the present invention to provide a method and device for setting different control levels between control devices.

It may be understood that the technical problems to be solved by the present invention are not limited to the above-mentioned technical problems. Thus, it may be understood that other technical problems which are not mentioned above may be apparent from the following description to those skilled in the art to which the present invention belongs.

In a first aspect of the present invention, there is provided a method for controlling a first device by a control device using BLE (Bluetooth Low Energy) technology in a wireless communication system.

In one embodiment of the first aspect, the method comprises establishing a BLE connection with the first device; opening a control channel for controlling the first device; determining a control level with the first device through the control path as a specific control level, wherein the control level indicating control authority for controlling the first device; and controlling a controllable operation of the first device based on the determined specific control level, wherein the specific control level is determined based on a required security level for the first device, and wherein the controllable operation is defined based on the determined specific control level.

In one embodiment of the first aspect, the control level is classified into first, second, and third levels based on controllable operations for providing a specific service, wherein the first level indicates a control level capable of controlling all operations associated with a specific service provided by the first device, wherein the second level indicates a control level capable of controlling only an operation related to a specific use of the specific service, and wherein the third level indicates a control level capable of controlling only the operation for providing the specific service.

In one embodiment of the first aspect, the required security level is determined based on an environment in which the first device is used.

In one embodiment of the first aspect, the control level is assigned a control priority indicating a priority for controlling the first device according to each level.

In one embodiment of the first aspect, the first device is a source device for providing audio data or a sink device for reproducing the audio data.

In one embodiment of the first aspect, the step of determining the specific control level further comprises: transmitting a request message to first device requesting to set the control level of the control device to the specific control level; and receiving from the first device a response message indicating that the control level of the control device is set to the specific control level.

In one embodiment of the first aspect, determining the specific control level further comprises: sending, by the control device, to the first device a request message to provide the control level for the control device; and receiving, by the control device, from the first device a response message indicating that the control level for the control device has been set to the specific control level.

In one embodiment of the first aspect, determining the specific control level further comprises: transmitting a request message to the first device requesting a control level of the control device; and receiving from the first device a response message indicating that the control level of the control device is set to the specific control level, wherein the specific control level is determined based on the first control level, wherein the controllable operation is defined based on the first control level.

In a second aspect of the present invention, there is provided a control device to control a first device using BLE (Bluetooth Low Energy) technology in a wireless communication system, the control device comprising: a communication unit configured to communicate with the first device in a wired or wireless manner; and a processor operatively coupled to the communication unit, wherein the processor is configured to: establish a BLE connection with the first device; open a control channel for controlling the first device; determine a control level with the first device through the control path as a specific control level, wherein the control level indicating control authority for controlling the first device; and control a controllable operation of the first device based on the determined specific control level, wherein the controllable operation is defined based on the determined specific control level.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 shows an example of a wireless communication system using a BLE technology according to an embodiment of the present invention.

FIG. 2 shows an example of an internal block diagram of a server device and a client device capable of implementing methods according to embodiments of the present invention.

FIG. 3 shows examples of Bluetooth communication architecture to which methods according to embodiments of the present invention may be applied.

FIG. 4 shows an example of a method for the connection procedure of the BLE specification.

FIG. 5 illustrates the characteristics of an audio signal.

FIG. 6 shows an example of a protocol stack of BLE which may use an isochronous channel.

FIG. 7 shows an example of a home ecosystem for applications to which an isochronous channel may be applied.

FIG. 8 shows an example of the type of an isochronous channel.

FIG. 9 shows an example of using an isochronous channel.

FIG. 10 shows an example of an operating state transition according to the BLE technology.

FIG. 11 shows various examples of isochronous stream transfer through an isochronous channel.

FIGS. 12 and 13 illustrate another example of a data transfer method using an isochronous channel.

FIG. 14 shows examples of an isochronous channel packet format which may be applied to methods according to embodiments of the present invention.

FIG. 15 shows a service usage architecture for each entity according to one embodiment of the present invention.

FIG. 16 is a flowchart illustrating an example of a method for sending and receiving audio streams through an LE connection to which a method proposed in this specification may be applied.

FIG. 17 is a flowchart illustrating another example of a method for sending and receiving audio streams through an LE connection to which a method proposed in this specification may be applied.

FIG. 18 is a flowchart illustrating an example of a method for sending and receiving audio streams in a BLE non-connection state to which a method proposed in this specification may be applied.

FIG. 19 is a flowchart illustrating an example of a method for sending and receiving audio streams in a BLE non-connection state to which a method proposed in this specification may be applied.

FIG. 20 shows a flow chart of a method for providing audio streams via a BLE connection in accordance with one embodiment of the present invention.

FIG. 21 shows a method for providing audio streams in accordance with another embodiment of the present invention.

FIG. 22 shows types of messages that the control device transmits/receives to/from the source device or the sink device according to one embodiment of the present invention.

FIG. 23 shows a method for providing audio streams according to one embodiment of the present invention.

FIG. 24 is a diagram illustrating an example of required security levels based on device types according to one embodiment of the present invention.

FIG. 25 is a diagram illustrating an example of control levels based on device use environment types according to one embodiment of the present invention.

FIG. 26 is a conceptual diagram showing accesses of a control device to a source device or a sink device according to one embodiment of the present invention.

FIG. 27 is a diagram illustrating an example of connections from an audio source to an audio sink via an audio controller according to one embodiment of the present invention.

FIG. 28 is a flowchart illustrating an example of a method for setting a control level for an audio controller according to one embodiment of the present invention.

FIG. 29 is a flowchart illustrating another example of a method for setting a control level for an audio controller according to one embodiment of the present invention.

FIG. 30 is a flowchart illustrating still another example of a method for setting a control level for an audio controller according to one embodiment of the present invention.

DESCRIPTION OF EXEMPLARY EMBODIMENTS

Hereinafter, the present invention is described in more detail with reference to appended drawings.

A suffix, such as "module" and "unit" introduced in the description herein, is assigned merely to facilitate description of this document, and the "module" and "unit" may be used interchangeably.

In this document, a device refers to a device capable of wireless communication, including a mobile phone, such as a smart phone, a tablet PC, a desktop computer, a notebook, and television, such as smart TV and IPTV.

Hereinafter, embodiments of the present invention are described in detail with reference to the accompanying drawings and description contained in the drawings, but the technical scope of the present invention is not restricted by the embodiments.

Wherever possible, general terms widely known to the public have been chosen as long as the terms do not obscure their technical functions intended in the present invention; however, those terms may be changed depending on the intention of those skilled in the art, practices, or the advent of a new technology.

In some cases, specific terms are chosen arbitrarily; in that case, a specific meaning of a corresponding term is described in a corresponding description.

Therefore, the terms used in this document should be interpreted on the basis of their actual meanings and description throughout the document rather than the immediate names of the terms.

FIG. 1 shows an example of a wireless communication system using a BLE technology according to an embodiment of the present invention.

The wireless communication system 100 includes at least one server device 110 and at least one client device 120.

The server device and the client device perform Bluetooth communication using Bluetooth low energy (hereinafter referred to as "BLE", for convenience sake) technology.

First, compared to a Bluetooth basic rate/enhanced data rate (BR/EDR) technology, the BLE technology requires a relatively small duty cycle. Products based on the BLE technology may be manufactured at a low cost, and may require very small power consumption at a low speed data transfer rate. The products may operate more than one year with a coin cell battery.

Furthermore, the BLE technology simplifies a connection procedure between devices and requires a smaller packet size than the Bluetooth BR/EDR technology.

Features of the BLE technology may be summarized as follows: (1) the number of RF channels is 40, (2) a data transfer rate of 1 Mbps is supported, (3) a star topology is used, (4) latency is 3 ms, (5) a maximum current is less than 15 mA, (6) output power is less than 10 mW (10 dBm), and (7) major application fields include mobile phones, watch, sports, health-care, sensor, and device control.

The server device 110 may operate as a client device in a relationship with a different device. Likewise, the client device may operate as a server device in a relationship with a different device. In other words, in a BLE communication system, a device may operate as a server device or a client device. In some cases, a device may operate as a server device and a client device at the same time.

The server device 110 may be called a data service device, master device, master, server, conductor, host device, audio source device, or first device. The client device may be called a slave device, slave, client, member, sink device, audio sink device, or second device.

The server device and the client device form a main part of a wireless communication system, and the wireless communication system may include other elements in addition to the server device and the client device.

The server device refers to a device which receives data from a client, directly performs communication with the client device. When receiving a data request from the client device, the server device provides data to the client device through a response.

Furthermore, the server device sends a notification message and indication message to the client device to provide information to the client device. Furthermore, when transmitting an indication message to the client device, the server device receives a confirm message corresponding to the indication message from the client device.

Furthermore, the server device may provide information to the user through a display unit or receive a request input from the user through a user input interface while transmitting and receiving notification, indication, and confirm messages to and from the client device.

Furthermore, the server device may read data from a memory unit or write new data to the corresponding memory while transmitting and receiving messages to and from the client device.

Furthermore, one server device may be connected to a plurality of client devices and may be easily connected to client devices again using bonding information.

The client device 120 refers to a device which requests information and data transmission from a server device.

The client device receives data from the server device through a notification message and indication message. When receiving an indication message from the server device, the client device sends a confirm message to the server device.

Like the server device, the client device may provide information to a user through a display unit or may receive an input from the user through a user input interface while transmitting and receiving messages to and from the server device.

Furthermore, the client device may read data from the memory unit or write new data into the memory unit while transmitting and receiving messages to and from the server device.

Hardware components, such as the display unit, user input interface, and memory unit of the server device or client device, are described in detail with reference to FIG. 2.

Furthermore, the wireless communication system may form a personal area network (PAN) using a Bluetooth technology. For example, the wireless communication system may exchange files and documents in a prompt and safe manner by forming a private piconet among devices.

A BLE device may operate in order to support various Bluetooth-related protocols, profiles, and processes.

FIG. 2 shows an example of the internal block diagram of a server device and client device capable of implementing methods according to embodiments of the present invention.

The server device may be connected to at least one client device.

Furthermore, in some embodiments, the internal block diagram of each device may further include other elements (or modules, blocks or units), and some of the elements of FIG. 2 may be omitted.

As shown in FIG. 2, the server device includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present invention.

Furthermore, the client device includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present invention.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device or the client device, and controls the server device or the client device in order in order to request the transmission of a message through the Bluetooth interface or other interface and to process a received message.

The processor 114, 124 may be represented by a controller or a control unit.

The processor 114, 124 may include application-specific integrated circuits (ASICs), other chipsets, logical circuits and/or data processing devices.

The memory 115, 125 may include read-only memory (ROM), random access memory (RAM), flash memory, a memory card, a storage medium and/or other storage devices.

The communication unit 118, 127 may include a baseband circuit for processing a radio signal. If an embodiment is implemented in the form of software, the aforementioned method may be implemented by a module (process or function) which performs the aforementioned function. The module is stored in the memory and is performed by the processor.

The memory 115, 125 may be installed inside or outside the processor 114, 124 and may be connected to the processor 114, 124 through various well-known means.

The display unit 111, 121 refers to a module for providing status information about a device and message exchange information to a user through a display.

The power supply unit 113, 123 refers to a module for receiving external or internal power under the control of the controller and for supplying power for the operation of each element.

As described above, BLE technology is characterized by a small duty cycle, and considerably reduces power consumption at a low data transfer rate. Accordingly, the BLE technology is capable of supplying power for the operation of each element even with small output power (which is less than 10 mW (10 dBm)).

The user input interface 112, 122 refers to a module for providing a user input, such as a display button to the controller, so that the user may control the operation of a device.

FIG. 3 illustrates an example of Bluetooth communication architecture to which methods according to embodiments of the present invention may be applied.

Specifically, FIG. 3 shows an example of an architecture of Bluetooth LE (Low Energy).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The GAP is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

③ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: It provides an alarm service according to the distance.

Proximity: A method for exchanging battery information.

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters the connection state when a device makes a connection request, that is, an initiating device sends a CONNECT_REQ PDU to an advertising device or the advertising device receives a CONNECT_REQ PDU from the initiating device.

Establishing a connection may be taken into consideration after the link layer enters the connection state. However, establishing a connection when the link layer enters the connection state may not need to be taken into consideration. The only difference between a newly created connection and an existing connection is a supervision timeout value for a link layer connection.

When two devices are connected to each other, they play respective different roles.

A link layer playing the role of a master is called a master device, whereas a link layer playing the role of a slave is called a slave device. A master device adjusts timing of a connection event. In this case, the connection event denotes the time when the mast device and a slave device are synchronized.

A master device (or central device) is a device that periodically scans a connectable advertising signal in order to establish a connection with other devices (slave or peripheral devices), and requests an appropriate device to establish a connection.

Furthermore, once connected to a slave device, a master device sets up timing and supervises a periodic data exchange.

In this case, the timing may be a hopping rule applied to two devices which exchange data through the same channel.

A slave (or peripheral) device is a device that periodically sends a connectable advertising signal in order to establish a connection with other devices (master devices).

Therefore, if a master device which has received a connectable advertising signal sends a connection request, a slave device accepts the request and establishes a connection with the master device.

After a slave device establishes a connection with a master device, the slave device periodically exchanges data by hopping a channel according to timing specified by the master device.

The packets defined in the Bluetooth interface is described briefly below. BLE devices use the packets described below.

Packet Format

The link layer has only one packet format used for both an advertising channel packet and a data channel packet.

Each of the packets includes four fields: a preamble, an access address, a PDU, and CRC.

If one packet is transmitted through an advertising physical channel, the PDU may function as an advertising channel PDU. If one packet is transmitted through a data physical channel, the PDU may function as a data channel PDU.

Advertising Channel PDU

The advertising channel PDU includes a 16 bit header and a payload of various sizes.

The PDU type filed of an advertising channel included in the header supports PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU includes a 16 bit header and a payload of various sizes, and may include a Message Integrity Check (MIC) field.

The procedures, statuses, and packet formats of the BLE technology described above may be applied to perform methods according to embodiments of the present invention.

FIG. 4 shows an example of a method for the connection procedure of the BLE specification.

A server sends an advertisement message through three advertisement channels (S4010).

The server may be called an advertiser before a connection is established and may be called a master after the connection is established. Examples of the server include sensors (e.g., temperature sensors).

Furthermore, the client may be called a scanner before a connection is established and may be called a slave after the connection is established. The client may be a smart phone, for example.

As described above, Bluetooth communication uses a total of 40 channels through a frequency of 2.4 GHz. Three of the 40 channels are advertisement channels, which are used for exchanging packets to establish a connection in addition to various advertising packets.

The remaining 37 channels are data channels which are used for the exchange of data packets after a connection is established.

After receiving the advertisement message, the client may send a scan request to the server in order to obtain additional data (e.g., a server device name) from the server.

The server sends a scan response, together with the remaining data, to the client in response to the scan request.

In this case, the scan request and the scan response are one type of an advertisement packet which may include only user data of 31 bytes or less.

Therefore, if a data size is larger than 31 bytes, but with large overhead from established connection to send data, the data is divided into two blocks and transmitted twice using the scan request/scan response.

Next, the client sends, to the server, a connection request for establishing BLE with the server (S4020).

Accordingly, a link layer (LL) connection is established between the server and the client.

Thereafter, the server and the client perform a security establishment procedure.

The security establishment procedure may be construed as secure simple pairing or may be performed with the secure simple pairing being included therein.

In other words, the security establishment procedure may be performed through a phase 1 to a phase 3.

More specifically, a pairing procedure (i.e., the phase 1) is performed between the server and the client (S4030).

Through the pairing procedure, the client sends a pairing request to the server, and the server sends a pairing response to the client.

In the phase 2, a legacy pairing or secure connection is performed between the server and the client (S4040).

In the SSP phase 3, a key distribution procedure is performed between the server and the client (S4050).

Through the phases, a secure connection is established between the server and the client, and encrypted data may be transmitted and received.

Overview of Isochronous Channel

FIG. 5 shows characteristics of an audio signal.

As shown in FIG. 5, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 5, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 5, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BE/EDR technology is used, high energy efficiency can be achieved because a relatively small amount of audio data is transmitted through an HA or headset. As described above, however, great overhead is generated because the data channel process of the BLE technology involves advertising, connection, etc. whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep. Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

Hereinafter, a method for sending and receiving data (e.g., audio data) generated at a regular interval using the BLE technology is described in detail.

In other words, a method for newly defining a channel for sending and receiving (or transceiving) data generated at a regular interval in the BLE technology, additionally defining a mechanism related to the handling of regular data without affecting energy performance of BLE, and sending data generated at a regular interval is provided below.

The phrases, such as audio streaming data, audio data, audio streaming, and audio stream used in this document, may be construed as providing the same meaning.

The term "audio data" is hereinafter used to represent the different terms, for convenience of understanding.

Isochronous Channel and Definition of a Mechanism Related to Isochronous Channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

FIG. 6 shows an example of a protocol stack of BLE which may use an isochronous channel.

Referring to FIG. 6, the protocol stack of BLE which supports an isochronous channel may be different from the protocol stack of FIG. 3.

More specifically, the protocol stack of BLE which supports an isochronous channel further includes an audio middleware layer added to the protocol stack of FIG. 3.

The audio middleware layer supports an isochronous channel for continuous data transmission and reception.

The isochronous channel includes a connection-oriented isochronous (ICO) channel for sending and receiving continuous data, that is, for point-to-point transmission, in an LE connection state and a connectionless isochronous (ICL) channel for sending and receiving continuous data, that is, for broadcast transmission, in a BLE non-connection state.

Continuous data (e.g., audio stream data) may be transmitted and received through the ICO and ICL channels of the audio middleware layer of BLE.

FIG. 7 shows an example of a home ecosystem for applications to which an isochronous channel may be applied.

In other words, FIG. 7 shows an example of the space in which a plurality of audio conductors and members to which methods according to embodiments of the present invention may be applied may move around inside/outside domains.

As shown in FIG. 7, the existence of various conductors and members indicate that an isochronous channel is required as a method for providing notification of the presence of members so that the members can obtain information necessary to form the isochronous channel.

An isochronous channel may also be used for the transmission and reception of non-audio data.

A member may use isochronous channels to determine existence of notification messages which may include acquisition information from conductors within the range of BLE communication.

Furthermore, the member may use isochronous channels to receive a request with respect to control information or service data from one or more devices acting like a remote controller.

FIG. 8 shows an example of the type of an isochronous channel.

Referring to FIG. 8, the isochronous channel may include a channel for point-to-point transmission and a channel for broadcast transmission.

More specifically, FIG. 8(a) shows connection-oriented isochronous (ICO) channels, that is, isochronous channels for point-to-point transmission. In FIG. 8(a), a master device and a slave device are connected through ICO channels, and may send and receive bi-directional data and responses thereto through the ICO channels.

The master device and the slave device may perform an LE connection (e.g., an ACL connection) in order to form and configure the ICO channels. In this case, the ACL connection and the roles of the master device and the slave device in the ICO channel are the same.

FIG. 8(b) shows connectionless isochronous (ICL) channels, that is, isochronous channels for broadcast transmission. The ICL channel is a channel for sending and receiving data in a BLE non-connection state. One or more slave devices have been synchronized with respective ICL channels from a master device in order to receive data.

The ICL channel sends one-way, but does not send a response thereto.

That is, the one or more slave devices are able to only receive data from the master device through the ICL channels, but are unable to send data to the master device through the ICL channels.

An embodiment of the present invention proposes a method for sending and receiving audio streams such an ICO channel and/or ICL channel.

FIG. 9 shows an example of using an isochronous channel.

In other words, FIG. 9 shows an example in which a pair of HAs is connected to a plurality of conductors and remote control devices through an isochronous channel.

As shown in FIG. 9, a right HA (HA-R) functions as a conductor that broadcasts data through an isochronous channel.

Furthermore, the HA-R may send a control request to all of devices once connected to the HA-R, such as the remote controllers of the HA-R, phone, music player, and coordinated left hearing aid (HA-L).

The left HA and/or the right HA may be used as conductors in the scenario as shown in FIG. 9.

FIG. 10 shows an example of operating state transition according to the BLE technology.

As shown in FIG. 10, an isochronous channel (or an ISO channel) may operate in conjunction with an advertisement channel and data channel of the BLE technology.

Referring to FIG. 10, a BLE device may change the operating state to (1) a first connected state or (2) a second connected state in which data is transmitted and received in an advertisement state.

In this case, the first connected state refers to an operating state in which the BLE device sends and receives data through a data channel, and the second connected state refers to an operating state in which the BLE device sends and receives data through an isochronous channel.

The BLE device may change its operating state to the first or second connected state depending on the type of data transmitted and received to and from devices or a data transmission type.

More specifically, the BLE device generates a data channel from an advertisement channel operating in the first connected state, and also generates an isochronous channel from an advertisement channel operating in the second connected state.

Furthermore, if the BLE device changes its operating state from the first connected state to the advertisement state, it releases a generated data channel. If the BLE device changes its operating state from the second connected state to the advertisement state, it releases a generated isochronous channel.

For example, the BLE device changes its operating state from the advertisement state to the second connected state in order to send and receive audio data. In other words, the BLE device may send and receive audio data through the isochronous channel while it is connected to the second connected state.

Furthermore, the BLE device changes its operating state from the advertisement to the first connected state in order to send and receive data generated in a random fashion or intermittently.

In other words, the BLE device may send and receive the data through the data channel in the first connected state.

As shown in FIG. 10, the BLE device makes a transition from the advertisement state to the first connected state by generating a data channel, if necessary, and sends and receives data through the generated data channel.

When the transmission and reception of the data through the data channel is completed, the BLE device closes the generated data channel and returns to the advertisement state, that is, the advertisement channel.

Likewise, the BLE device makes a transition from the advertisement state to the second connected state by generating an isochronous channel, if necessary, and sends and receives data through the generated isochronous channel.

When the transmission and reception of the data through the data channel is completed, the BLE device closes the generated isochronous channel and returns to the advertisement state, that is, the advertisement channel.

As described above, the isochronous channel is generated in order to send and receive data generated at a regular interval, such as audio data, while the data channel is generated in order to send and receive data irregularly or intermittently.

FIG. 11 illustrates various examples of isochronous stream transfer through an isochronous channel.

FIGS. 11(a) to (d) show various topologies used to send an isochronous stream, and FIGS. 11(a) to (d) show conductors establishing isochronous channels with the following member(s).

Two members which may receive the same or different isochronous streams (e.g., a mono stream, a joint stereo stream or separate left and right audio streams), Three groups of members, with each group synchronized to a separate isochronous stream, A single member receiving a single isochronous stream from a single isochronous channel.

A conductor establishes a plurality of isochronous channels sharing characteristics including the anchor point of the isochronous channel, by which members of a conductor may make the anchor points performed at the same time. Such isochronous streams are called an "ensemble."

A single isochronous channel which sends a single isochronous stream to a single member may not be an example of the ensemble, where such point-to-point topology may be usually described as being operated according to the unicast scheme when it is used for transmission of audio data.

Furthermore, an isochronous channel may be used to broadcast control information to one or more members, to respond to individual broadcast transmission, or to selectively request more information.

Through the operation described above, the conductor may operate in conjunction with a plurality of remote control devices. As shown in FIG. 15, a BLE device may function as a member of an isochronous channel or as the conductor of a different BLE device.

In other words, BLE devices may function as both a conductor and a member in order to establish a plurality of isochronous channels.

FIGS. 12 and 13 illustrate another example of a data transfer method using an isochronous channel.

More specifically, FIG. 12 shows an example of a unicast transmission method, and FIG. 16 shows an example of a broadcast transmission method.

First, the unicast transmission method through an isochronous channel is described with reference to FIG. 12.

In the case of the unicast transmission method, devices may operate an isochronous channel selectively for one or more unicast transmissions.

As shown in FIG. 12, a master may unicast the same or different data to a predetermined number of connected or selected slaves.

The master may generate a dual isochronous channel in order to perform bilateral communication with slaves, if necessary.

In other words, the master may form a dual isochronous channel by generating one isochronous channel along with one slave and the other isochronous channel along with the slave.

In this case, the generation of the dual isochronous channel may indicate that a downlink isochronous channel and an uplink isochronous channel are respectively generated in order to achieve bilateral communication between the master and the slave or that isochronous channels are generated between the master and two or more slaves.

Broadcast transmission through an isochronous channel is described below with reference to FIG. 13.

As shown in FIG. 13, broadcast transmission through an isochronous channel is performed according to multicast transmission differently from the broadcast transmission method used for most cases (i.e., a method for sending data to all of devices).

In other words, broadcast transmission through the isochronous channel defined in the BLE specification refers to broadcasting data only to a slave dependent to a generated isochronous channel.

In other words, the master broadcasts data only to approved slaves through an isochronous channel.

Therefore, broadcast transmission through the isochronous channel defined in the BLE specification should be construed as multicast transmission towards a specific group.

FIG. 14 shows examples of an isochronous channel packet format which may be applied to methods according to embodiments of the present invention.

The format of the isochronous channel packet transmitted through an isochronous channel is the same as that shown in FIGS. 14(a) and (b), but the present invention is not limited thereto and may have a different format.

As shown in FIG. 14(a), all of isochronous channels may have the packet format defined in the Bluetooth specification v4.2 supporting an isochronous data PDU of 2 to 257 octets.

FIG. 14(a) shows an example of an extended PDU packet format, and the extended PDU packet format 1410 includes a preamble 1411, an access address 1412, a PDU 2011, and cyclic redundancy check (CRC) 1414.

The preamble may include 1 octet, an access address of 4 octets, a PDU of 2 to 257 octets, and CRC of 3 octets.

FIG. 14(b) shows an example of an isochronous packet, and the isochronous packet (or isochronous channel PDU 1420) may include a header 1421 of 16 bits and payload 1422 of 0 to 255 octets.

Furthermore, the isochronous packet may include a length field of an 8 bit size, which is used to check the length of data located next to the header.

The data length of the isochronous packet varies depending on the space between isochronous channels and may be limited by a channel parameter imposed by a conductor. The isochronous packet may further include a message integrity check (MIC) field.

FIG. 15 shows a service usage architecture for each entity according to one embodiment of the present invention. Specifically, FIG. 15(a) shows a terminology to service mapping relationship according to one embodiment of the present invention. FIG. 15(b) shows a service mapping relationship within a client-server architecture according to one embodiment of the present invention.

Referring to FIG. 15(a), a source device may be implemented as a server that provides services for Audio-A, Audio-C, and Audio-S. In addition, a sink device may be implemented as a server that provides services for Audio-A and Audio-C, and may be implemented as a client for Audio-S. Further, a control device may be implemented as a client for Audio-A and Audio-C.

In addition, the control device may be referred to as an audio controller (AC) herein.

In this connection, Audio-A is an audio link that supports advertising and announcement of audio data. Audio-C is an audio link that supports control and configuration of audio data to be transmitted. Audio-S is an audio link that supports the transmission of audio streams.

In one embodiment, a service for Audio-A may be a service (e.g., a source device service or a sink device service) provided over an Audio-A link supporting advertisement and announcement of audio data. A service for Audio-C may be a service (e.g., a source device service or a sink device service) provided over an Audio-C link that supports control and configuration of audio data to be transmitted. A service for Audio-S may be a service (e.g., a source device service) provided over an Audio-S link supporting transmission of audio streams.

Referring to FIG. 15(b), for a certain service, which entity acting as a server providing the service, and which entity acting as a client accessible to the service may be determined.

For example, as for a source device service for Audio-A, it may be confirmed that the source device operates as a server and the control device operates as a client. Further, as for a source device service for Audio-C, it may be confirmed that the source device operates as a server and the control device operates as a client. Furthermore, as for a source device service for Audio-S, it may be confirmed that the source device operates as a server and the sink device operates as a client.

In another example, as for a sink device service for Audio-A or Audio-C, it may be confirmed that the sink device operates as a server and the control device operates as a client.

In still another example, as for a metadata service, it may be confirmed that the source device operates as a server and the control device operates as a client. Further, as for a transmission information service, a codec information service, a control device control service, or a volume service, it may be confirmed that the source device or the sink device operates as a server and the control device operates as a client.

In yet still another example, as for an encryption service among content protection services, it may be confirmed that the source device operates as a server and the control device operates as a client.

For example, as for the metadata service, it may be confirmed that the source device operates as a server providing the service, and the control device operates as a client accessible to the service. In this embodiment, it may be confirmed that the sink device is not related to the metadata service.

FIG. 16 is a flowchart illustrating an example of a method for sending and receiving audio streams through an LE connection to which a method proposed in this specification may be applied.

Referring to FIG. 16, the first device 200 that is a slave device, may establish an LE connection with the second device 300 that is a master device, may generate an isochronous channel, and may receive audio stream data through the isochronous channel.

A detailed procedure for receiving audio stream data through an LE connection is described in detail below.

LE connection establishment procedure S16010

The first device 200 may perform an LE connection establishment procedure with the second device 300 in order to receive audio stream data from the second device 300.

In this case, the LE connection establishment procedure may be performed through the method described with reference to FIG. 7.

Service Level Connection Establishment Procedure S16020

After establishing an LE connection with the second device 300, the first device 200 may perform a service level connection establishment procedure.

For example, the first device 200 may perform state synchronization through the service level connection establishment procedure, and may open a control channel (i.e., a second channel) in order to control an isochronous channel (i.e., a first channel) for sending and receiving audio stream data.

In this case, the control channel may be one of BLE data channels.

If the first device 200 is divided into a left device and a right device like a headset, the state synchronization means that synchronization is performed between the left device and the right device and may be performed through the GATT message of BLE.

After opening the control channel, the first device 200 may perform a codec & transfer parameter negotiation procedure along with the second device 300 (S16030).

Codec & Transfer Parameter Negotiation Procedure S16030

The first device 200 may determine audio stream data and parameters related to the transmission and reception of the audio stream data through a codec parameter and transport parameter negotiation procedure along with the second device 300.

More specifically, the first device 200 may send a supported codec parameter and transfer parameter to the second device 300.

The codec parameter may include a codec name (or a codec type), a sample rate indicative of a total number of samples extracted during 1 second, a bit depth indicative of the potential precision of hardware or software which processes audio data in digital audio, a bit rate, a frame length, and audio channel information (e.g., mono, stereo, or dual mode).

The transfer parameter may include maximum transport latency, the number of audio streams, and an encryption level.

Thereafter, the first device 200 may receive a codec parameter and transfer parameter, supported by the second device, from the second device 300 and select proper parameters of common parameters.

In an embodiment, the second device 300 may select proper parameters of the received codec parameter and transfer parameter and send the selected parameters to the first device 200.

In an embodiment, the second device 300 may send a supported codec parameter and transfer parameter to the first device 200. The first device 200 may select proper parameters of the received parameters and send them to the second device 300.

Isochronous Connection Establishment Procedure S16040

After selecting proper parameters through the codec & transfer parameter negotiation procedure, the first device 200 and the second device 300 may perform an isochronous connection establishment procedure.

Through the isochronous connection establishment procedure, the first device 200 may form an audio stream along with the second device 300 and may open an isochronous channel for sending and receiving the formed audio stream.

In this case, the type (i.e., ICO or ICL) of the isochronous channel, a channel ID (CID), a channel map, a connection interval, latency, a channel count, and a retransmission count may be determined through the isochronous connection establishment procedure.

Audio Stream Connection Establishment Procedure S16050

The first device 200 that has opened the isochronous channel may perform an audio stream connection establishment procedure along with the second device 300.

The audio stream connection establishment procedure is a procedure for sending and receiving the formed audio stream. The first device 200 may configure (or assign) a role for sending and receiving the formed audio stream to and from the second device 300 through the audio stream connection establishment procedure.

Furthermore, state synchronization may be performed between the first device 200 and the second device 300. The first device 200 and the second device 300 may open an audio link for sending and receiving the formed audio stream.

Thereafter, the first device 200 may receive an audio stream from the second device 300 and output the received audio stream to the outside through the output unit.

Through such a method, the first device 200 may determine proper parameters for sending, receiving, and playing back audio streams along with the second device 300, and may provide an audio streaming service through the determined parameters.

FIG. 17 is a flowchart illustrating another example of a method for sending and receiving audio streams through an LE connection to which a method proposed in this specification may be applied.

Referring to FIG. 17, unlike in the example of FIG. 16, a service level connection establishment procedure may not be performed, but state synchronization may be performed in an audio stream connection establishment procedure.

More specifically, the first device 200 may perform an LE connection establishment procedure along with the second device 300 in order to receive audio stream data from the second device 300 (S17010).

In this case, the LE connection establishment procedure may be performed through the method described with reference to FIG. 4.

The first device 200 may open a control channel in order to control an isochronous channel for sending and receiving audio stream data to and from the second device 300.

Thereafter, step S17020 and step S17030 are the same as step S16030 and step S16040 of FIG. 16, and a description thereof is omitted.

The first device 200 that has opened the isochronous channel may perform an audio stream connection establishment procedure along with the second device 300 (S17040).

The audio stream connection establishment procedure is a procedure for sending and receiving the formed audio stream. The first device 200 may configure (or assign) a role for sending and receiving the formed audio stream to and from the second device 300 through the audio stream connection establishment procedure.

Furthermore, state synchronization may be performed between the first device 200 and the second device 300. The first device 200 and the second device 300 may perform the state synchronization described at step S16020 of FIG. 16 through the GATT message.

Furthermore, the first device 200 and the second device 300 may open an audio link for sending and receiving the audio stream.

Thereafter, the first device 200 may receive an audio stream from the second device 300 and output the received audio stream to the outside through the output unit.

FIG. 18 is a flowchart illustrating an example of a method for sending and receiving audio streams in a BLE non-connection state to which a method proposed in this specification may be applied.

Referring to FIG. 18, in a BLE non-connection state, audio stream data may be transmitted and received through an isochronous channel.

More specifically, the second device 300, that is, a master device, sends an advertising message to the first device 200, that is, a slave device (S18010).

The advertising message may include metadata by which the type of data transmittable by the second device 300 through an isochronous channel can be identified and an identifier indicative of an advertising channel through which an extended advertising message capable of obtaining additional information is transmitted.

The first device 200 may change a channel based on the identifier and receive the extended advertising message from the second device 300 (S18020).

The extended advertising message may include information about a channel through which audio stream data is transmitted and the codec parameter and transfer parameter.

Thereafter, the first device 200 may determine parameters for receiving and outputting audio streams based on the received codec parameter and transfer parameter.

After determining the parameters, the first device 200 may change an existing channel to a channel through which audio stream data is transmitted, may receive the audio stream data from the second device 300 through the isochronous channel, and may output the received audio stream data through the output unit.

Through such a method, audio stream data can be received through an isochronous channel even in the BLE non-connection state.

FIG. 19 is a flowchart illustrating an example of a method for sending and receiving audio streams in a BLE non-connection state to which a method proposed in this specification may be applied.

Referring to FIG. 19, a slave device may receive information for receiving audio stream data from a master device in a BLE non-connection state and may provide an audio streaming service.

More specifically, the first device 200, that is, a slave device, may send an advertising message to the second device 300, that is, a master device. After receiving the advertising message, the second device 300 may discover the first device (S19010).

The first device 200 may request synchronization information for synchronization with the second device 300 from the second device 300 through the advertising message.

In response to the advertising message, the second device 300 may send an extended scan request message, including the synchronization information, to the first device 200 (S19020).

The extended scan request message may include the codec parameter and transfer parameter in addition to the synchronization information.

Thereafter, the first device 200 may determine parameters for receiving and outputting audio streams based on the received codec parameter and transfer parameter.

After determining the parameters, the first device 200 may be synchronized with the second device 300, may receive audio stream data from the second device 300 through an isochronous channel, and may output the received audio stream data through the output unit (S19030).

FIG. 20 shows a flow chart of a method for providing audio streams via a BLE connection in accordance with one embodiment of the present invention. In particular, FIG. 20 shows one embodiment of a method for providing a service including audio data using a BLE manner. In a following description of FIG. 20, the details as descried above with reference to FIG. 4 will be omitted.

Referring to FIG. 20, a BLE connection may be established between a source device, a control device and a sink device by establishing a BLE connection between the sink device and the control device, and establishing a BLE connection between the source device and the control device, respectively.

In this connection, each of the BLE connections may be established using the method as described above with reference to FIG. 4.

By transmitting a registration request message to the source device and the sink device in a state in which the BLE connection between the source device, the control device, and the sink device is established, the control device for controlling the source device and the sink device may be registered.

Specifically, the control device registration method may include a control path opening procedure (S20010). Specifically, the control device may perform a procedure of opening a control path (or channel) for the source device and/or the sink device. In this connection, the control channel may be one of data channels of BLE audio. The control channel may be a data channel (or link) for transmission of control information (or data) for control and configuration of the audio data.

In one embodiment, the control device may open the control channel for the source device and the sink device by registering the control device as a remote controller for the source device or the sink device. For example, the control device may send a registration request message (Register RC) to the source device and receives a response message to the registration request message from the source device. In this way, the control device may register the control device as the remote controller for the source device. In another example, the control device may transmit a registration request message (Register RC) to the sink device, and receive a response message to the registration request message from the sink device. In this way, the control device may register the control device as the remote controller for the sink device. Thus, the control device may open the control channel for the source device and the sink device, and may control each of the source device and the sink device via the control channel.

Thereafter, when the provision of the audio streams is ended, the control device may be deregistered as the controller for controlling the source device and the sink device, and, then, the control path may be closed.

Specifically, the control device deregistration method may include a control path closed procedure (S20020). Specifically, the control device may perform a procedure of closing the control path (or channel) for the source device and/or the sink device. In this connection, the control channel may be one of data channels of BLE audio. The control channel may be a data channel (or link) for transmission of control information (or data) for control and configuration of the audio data.

In one embodiment, the control device may close the control channel for the source device and the sink device by deregistering the control device as the remote controller for the source device or the sink device. For example, the control device may send a deregistration message (De-register RC) to the source device, and receive a response message to the deregistration message from the source device. In this way, the control device may deregister the control device as the remote controller for the source device. In another example, the control device may send a deregistration message (De-register RC) to the sink device, and receive a response message to the deregistration message from the sink device. In this way, the control device may deregister the control device as the remote controller for the sink device. Thus, the control device may close the control channel for the source device and the sink device.

In one embodiment, when the source device or the sink device moves out of a preset range, the control device may perform the control path closed procedure described above. In this case, the BLE connection may be disabled based on a predetermined connection timeout. For example, the BLE connection may be disabled when the predetermined connection timeout period elapses after the control path is closed. Thereafter, when the source device or the sink device re-enters the preset range, the control device may again enable the BLE connection and perform the control path opening procedure.

FIG. 21 shows a method for providing audio streams in accordance with another embodiment of the present invention. Specifically, FIG. 21 shows how the sink device reproduces the audio streams under the control of the control device when the source device has transmitted the audio streams in a broadcast or public announcement manner.

Referring to FIG. 21, prior to the audio streams transmission, the BLE connection procedure and the control path opening procedure between the control device and the sink device may be performed. In this way, the control device may be registered with respect to the sink device. In the embodiment of FIG. 21, the control path opening procedure may not be performed between the control device and the source device because the source device transmits the audio streams in the broadcast or public announcement manner. That is, registration of the control device with respect to the source device may be unnecessary.

The source device may transmit an advertisement message. In one embodiment, the advertisement message may include information about the source device. For example, the advertisement message may include at least one of identification information (e.g., audio stream ID information) about the source device, language information, synchronization information, transmission parameter information, and codec parameter information. In one embodiment, the identification information may be a universally unique identifier (UUID) information about the audio stream provided from the source device.

After the control device is registered with respect to the sink device, when the control device receives the advertisement message from the source device, the control device ma generate a control message for the sink device based on the advertisement message. For example, the control device may generate a control message associated with receipt of the audio streams based on the advertisement message. In one embodiment, the control message may include stream ID information about the audio streams provided from the source device. Thereby, the sink device may receive the audio streams from the source device.

FIG. 22 shows types of messages that the control device transmits/receives to/from the source device or the sink device according to one embodiment of the present invention. Specifically, FIG. 22 shows types of messages that the control device sends/receives to/from the source device or the sink device after the control device has been registered.

Referring to FIG. 22, the control device may control the source device or the sink device by transmitting a control command (or a control message) to the source device or the sink device. Further, the control device may receive a response message to the control message from the source device or the sink device. Furthermore, the control device may receive an event message or an indication message from the source device or the sink device. The event message may include information about an event occurring at the source device or the sink device. The indication message may include indication information by the source device or the sink device.

FIG. 23 shows a method for providing audio streams according to one embodiment of the present invention. Specifically, FIG. 23 shows how the audio streams are provided under control of the control device after the BLE connection procedure and the control path opening procedure described above have been performed.

Referring to FIG. 23, the method for providing the audio streams may include a control procedure. Specifically, the control device may perform a procedure for controlling the source device or the sink device. In one embodiment, the control device may control the source device or the sink device by sending a control command (message) to the source device or the sink device via the control channel. In this case, the source device or the sink device may perform a corresponding operation to the control message, and, accordingly, may transmit a response message to the control device. As used herein, the control message may be referred to as an audio stream command (CMD).

In one embodiment, the control device may control the source device by transmitting a first control message to the source device. For example, the control device may control the source device by sending, to the source device, a first control message (e.g., a streaming execution message) for the service (e.g., an audio streaming service) provided by the source device. In this case, the first control message may include information related to the service (e.g., streaming server address information for streaming execution, etc.).

Thereafter, the source device may perform a corresponding operation (for example, streaming execution) to the first control message and may transmit a first response message to the control device. In this case, the first response message may include information (e.g., audio stream ID information) for receiving the audio streams provided from the source device. In one embodiment, the audio stream ID information may be associated with information about a channel through which the audio streams are transmitted.

In one embodiment, the control device may control the sink device by transmitting a second control message to the sink device. For example, the control device can control the sink device by sending, to the sink device, a second control message (e.g., an audio playback start message) for the service (e.g., an audio playback service) provided by the sink device. In one embodiment, the second control message may be a message generated based on the first response message. For example, the second control message may be a message including the audio stream ID information included in the first response message. This allows the sink device to acquire information for receiving the audio streams provided from the source device.

Subsequently, the sink device may perform a corresponding operation (for example, audio playback start) to the second control message, and may transmit a second response message to the control device. In this case, the second response message may include information on whether or not the operation based on the second control message is successfully performed.

In this way, the control device may control the source device and the sink device by transmitting the first control message to the source device, receiving the first response message to the first control message from the source device, generating the second control message based on the first response message, transmitting the second control message to the sink device, and receiving the second response message to the second control message from the sink device. This allows the control device to control the establishment of the transmission path for transmission of the audio streams between the source device and the sink device.

In one embodiment, the transmission path formation procedure for audio stream transmission may be performed by at least one of the above-described isochronous connection establishment and procedure audio stream connection establishment procedures.

In addition, the method for providing the audio streams may include an audio stream transmitting/receiving procedure. In one embodiment, the sink device may receive the audio stream provided from the source device based on the second control message. For example, the sink device may receive the audio streams over a channel on which the audio streams are received based on the audio stream ID information included in the second control message. The sink device may then play (or render) the received audio streams.

However, when a plurality of control devices control the source device that provides the audio data or the sink device that reproduces the audio data, a conflict may occur between the control devices.

That is, when each of the control devices controls the same sink device or the same source device, operations to be controlled by the control devices may be different from each other, thereby causing an error in the operation of the controlled source device or the controlled sink device.

In addition, only a specific control device needs to control the source device or the sink device, for example, in a secret meeting, etc. In this connection, when a control device other than the specific control device is allowed to control the same source device or the same sink device, there is a problem that the source device or the sink device may not be controlled by the specific control device.

Accordingly, in order to solve such a problem, the present invention proposes a method for setting control levels for the control devices to control the sink device or the source device according to the set control levels.

FIG. 24 is a diagram illustrating an example of required security levels based on device types according to one embodiment of the present invention.

Referring to FIG. 24, the devices may have different required security levels based on environments in which the devices are used respectively. A security problem may occur when a device with a higher required security level is controlled by a plurality of control devices.

Specifically, a device (e.g., a smartphone, etc.) that is only available to a specific user has a lower or no required security level. That is, the device used in a personal environment does not need a special security level because the specific user manages all devices for receiving services.

In this connection, since the specific user manages all control devices, there is no collision between the control devices for controlling the sink device or the source device.

In addition, when a use environment for a device is a public place, there is no required security level because the device cannot be controlled, or, a security problem occurrence is less likely even if the device is controlled by a plurality of control devices.

However, devices that are shared by specific groups do not have the required security level in situations where security problems do not occur. However, this is not the case for certain situations (e.g., a secret meeting, an announcement of a non-disclosed product, etc.).

In this connection, when a device shared by a plurality of devices is controlled, an error may occur in an operation of the shared device due to different control commands among the sharing devices. Further, security problems such as leakage of confidential data may occur.

Accordingly, the present invention provides a method for restricting control authorities of the control devices based on the required security levels for the controlled device and thus setting controllable operations for the controlled device differently based on the control levels since the required security levels for the controlled device are different based on the use environments for the controlled device.

FIG. 25 is a diagram illustrating an example of control levels based on device use environment types according to one embodiment of the present invention.

Referring to FIG. 25, control levels and priories are different based on device use environment types. Accordingly, controlled operations under the control device are restricted according to the control levels.

Specifically, the control levels assigned to the control devices may be classified into high, normal, or limited levels. The controlled operations corresponding to the high, normal, or limited control levels respectively are as follows:

High: the control device controls all operations for the controlled device, including enabling and disabling the service;

Normal: the control device controls operations (for example, service start and stop, volume adjustment, etc.) for the controlled device for operating the service, excluding enabling and disabling the service; and Limited: the control device controls only receipt of the service by the controlled device. That is, the control device cannot control any operation of the source device providing the service or the sink device operating the service.

As for a controlled device used in the personal environment, there is a low probability of collision between the control devices for the controlled device, and a user of the control devices must be able to control all the functions of the controlled device via the control devices. Thus, as for the controlled device used in the personal environment, the control levels assigned to the control devices may be set as the high level.

As for the controlled device used in a public place, the low control level may be assigned to the control devices for the controlled device because the controlled device must provide the same service to a large number of users.

As for the controlled device shared in a specific group, a high security level may be required depending on the specific situation, as described above with reference to FIG. 24. Thus, the high or normal security level may be assigned to the control device for the controlled device, depending on the required security levels thereof.

Further, each of the security levels may have each assigned control priority thereto among the control devices. Thus, the control devices may have control priorities based on the security levels.

For example, as shown in FIG. 25, a priority 1 may be set for the high control level, a priority 2 for the normal control level, and a priority 3 for the limited control level.

The control device may control a specific device based the control priority assigned thereto. For example, the control device whose control level is set to be high may control the specific device prior to a control device whose control level is set to be normal.

In this way, by setting the controlled operations among the control devices differently based on the use environment of the controlled device, errors due to different control commands among the control devices may be be prevented when there are a plurality of the control devices.

Furthermore, by setting only the control level of the specific control device to be high, there is an effect that the probability of occurrence of a security problem in the controlled device shared by the specific group may be reduced.

FIG. 26 is a conceptual diagram showing accesses of a control device to a source device or a sink device according to one embodiment of the present invention.

In one embodiment, the access from the control device to the service(s) provided by the source device has a tendency to focus on unicast/broadcast. Further, the access of the control device to the service(s) provided by the sink device tends to focus on the environment (e.g., Personal/Shared/Public) in which the sink device is used.

In addition, the source device may set the control levels for the control device differently based on the environments in which the source device is used.

Referring to a left table of FIG. 26, the source device (e.g., a music source device, TV, etc.) used in the personal environment may set a control level for the control device to be high. Further, the source device (e.g., a music source device, TV, door bell, etc.) used in the shared environment may set a control level for the control device to be normal. In this case, there may be another remote controller with exclusive access. Moreover, the source device (e.g., for smoke alarm, public announcement, commercial advertisement, etc.) used in the public environment may set a control level for the control device to be a limited level.

The control device may control operations of the source device based on the control level set by the source device itself.

Referring to a right table of FIG. 26, the sink device (e.g., a hearing aid, headset, speaker(s), etc.) used in the personal environment may set a control level for the control device to be high. Further, the sink device (e.g., a party mode speaker (s)) used in the shared environment may set a control level for the control device to be normal. In this case, there may be another remote controller with exclusive access. Moreover, the sink device (e.g., a dedicated speaker) used in the public environment may set a control level for the control device to be a limited level.

FIG. 27 is a diagram illustrating an example of connections from an audio source to an audio sink via an audio controller according to one embodiment of the present invention Referring to FIG. 27, a source device and a sink device, each having a different use environment, may be connected via a control device. Thus, the control device may control the source device and the sink device, respectively.

Specifically, as shown in FIG. 26, the source device may be used in personal, shared, and public environments, while the sink device may be be used in personal and shared environments.

The source device used in each environment may be connected to the sink device used in each environment via the control device.

For example, the source device used in a personal environment may be connected to the sink device used in a personal environment or a shared environment via the control device.

A following Table 1 is an example of connections between the source device and the sink device via the control device shown in FIG. 27.

TABLE 1

| Connection combinations | Use examples |
| --- | --- |
| 1-AC-1 (Personal source-AC-Personal sink) | To control a sink device or source device in a personal space |
| 1-AC-2 (Personal source-AC-Shared sink) | For a party host to control multi-speakers (sink devices) |
| 2-AC-1 (Shared source-AC-Personal sink) | To connect to a desired source device to receive audio in the conference room |
| 2-AC-2 (Shared source-AC-Shared sink) | To receive audio streams by connecting TV in a living room to a speaker |
| 3-AC-1 (Public source-AC-Personal sink) | To receive announcement via a personal earphone at airport |
| 3-AC-2 (Public source-AC-Shared sink) | To receive audio streams via multi-speakers in a car in a car theater |

In this connection, the control device may be assigned a control level for controlling the source device and a control level for controlling the sink device separately.

For example, the control level assigned to the control device for controlling the sink device used in the personal environment may be set to be high. The control level assigned to the same control device for controlling the sink device used in the shared environment may be set to be a limited level.

There may be three methods as follows for the control device to obtain the control level for controlling the sink device or the source device.

In a first approach, the control device transmits its desired control level to the source device (or sink device), and, then, the source device (or sink device) sets the transmitted control level to the control level for the control device.

In a second approach, the control level for the control device is preset as a specific control level in the source device (or sink device). When the control device requests the source device (or sink device) to set the control level for the control device, the source device (or sink device) sets the control level for the control device to the preset specific control level.

In a third approach, the control level for the control device is preset as a specific control level in the source device (or sink device). The control device transmits its desired control level to the source device (or sink device).

The source device (or sink device) determines the control level for the control device by comparing the preset specific control level with the desired control level transmitted from the control device, and, then, sets the determined control level to the control level for the control device.

Hereinafter, each of methods for setting the control level for the control device by a first device as the source device (or sink device) will be described in detail.

FIG. 28 is a flowchart illustrating an example of a method for setting a control level for an audio controller according to one embodiment of the present invention.

Referring to FIG. 28, the control device 400 transmits a desired control level to the first device 200, and, then, the first device 200 sets the control level for the control device to the transmitted desired control level.

Specifically, when the control device 400 desires to control the first device 200, a control level indicating control authority for the first device 200 must be set in the first device 200.

The control level refers to a level for limiting operations for the first device 200 which can be controlled by the control device 400. The control device 400 may control operations for the first device 200 based on the control level assigned thereto.

The control level may be classified into the high level, the normal level, and the limited level based on controllable operations for the controlled device, as shown in FIG. 15. The control priorities indicating control orders among the control devices may be assigned to the control devices based on the control levels thereof respectively.

The control device 400 transmits a request message to the first device 200 for the first device 200 to set a control level for controlling the first device 200 by the control device 400 (S28010).

In this connection, the request message may include information indicating a specific control level determined by the control device 400 based on the use environments for the first device 200.

In this connection, the use environments may include personal, shared, or public environments as discussed above with reference to FIG. 24 and FIG. 25.

Upon receiving the request message including the information indicating the determined control level from the control device 400, the first device 200 sets the control level for the control device 400 to the received specific control level.

Thereafter, the first device 200 transmits a response message to the control device 400 to notify the control device 400 that the control level for the control device 400 has been set to the specific control level (S28020).

Upon receiving the response message from the first device 200, the control device 400 may be aware that the control level for the control device 400 has been set to the specific control level. Thus, the control device 400 controls operations for the first device 400 based on the set specific control level.

FIG. 29 is a flowchart illustrating another example of a method for setting a control level for an audio controller according to one embodiment of the present invention.

Referring to FIG. 29, the control device 400 requests the first device 200 to set the control level for the control device 400, and, then, the first device 200 sets the control level for the control device to a preset control level.

Specifically, the first device 200 pre-sets the control levels for the control devices in advance.

For example, when the specific condition is satisfied, the control level for the control device may be set to a specific control level.

In this connection, the first device may set the control level for the control devices to the specific control level under following specific conditions:

First, after the first device 200 is reset and initialized, the control device connected to the first device 200 for the first time may be assigned a high control level.

Second, a specific password may be set for each control level (for example, OOB (Out Of Band) type). The control levels may be set for control devices respectively based on the passwords input from the control devices. For example, a control device that has input a first password may be assigned a high control level, and a control device that has input a second password may be assigned a limited control level.

Subsequently, the control device 400 transmits a request message to the first device 200 for the first device 200 to set a control level for controlling the first device 200 by the control device 400 (S29010).

In this connection, the request message may include information indicating a first control level determined by the control device 400 based on the use environment for the first device 200.

In this connection, the use environments may include personal, shared, or public environments as discussed above with reference to FIG. 24 and FIG. 25.

Upon receiving the request message including the information indicating the determined control level from the control device 400, the first device 200 sets the control level for the control device 400 to the preset control level.

For example, when the control device 400 satisfies a predetermined condition preset in the first device 200, the control level for the control device 400 may be set to a specific control level according to a specific condition.

In this connection, the specific control level may not be the same as the first control level.

Thereafter, the first device 200 transmits a response message to the control device 400 to notify the control device 400 that the control level for the control device 400 has been set to the specific control level (S29020).

Upon receiving the response message from the first device 200, the control device 400 may be aware that the control level for the control device 400 has been set to the specific control level. Thus, the control device 400 controls operations for the first device 400 based on the set specific control level.

FIG. 30 is a flowchart illustrating still another example of a method for setting a control level for an audio controller according to one embodiment of the present invention.

Referring to FIG. 30, the control device 400 requests the first device 200 to set a control level for the control device 400. In a response, the first device 200 compares a preset control level with the requested control level. Based on the comparison, the first device 200 determines a control level for the control device 400 to be set.

Specifically, the first device 200 presets a control level for the control device 400 in advance. This present control level may be referred to as a first control level.

The control device 400 transmits a request message to the first device 200 for the first device 200 to set a control level for controlling the first device 200 by the control device (S30010).

In this connection, the request message may include information indicating a second control level determined by the control device 400 based on the use environment for the first device 200.

In this connection, the use environments may include personal, shared, or public environments as discussed above with reference to FIG. 24 and FIG. 25.

Upon receiving the request message including the information indicating the determined control level from the control device 400, the first device 200 determines the control level for the control device 400 as a specific control level. Then, the first device 200 sets the control level for the control device 400 to the specific control level.

In this connection, the specific control level may be determined via negotiation between the first control level and the second control level.

Specifically, the first device 200 compares the first control level for the control device 400 preset by the first device 200 with the second control level that is determined by the control device 400.

When the first control level is higher than the second control level, the first device 200 sets a control level for the control device 400 to the second control level or a control level lower than the second control level.

To the contrary, when the first control level is lower than the second control level, the first device 200 sets the control level for the control device 400 to the first control level or a control level lower than the first control level.

Thereafter, the first device 200 transmits a response message to the control device 400 to notify the control device 400 that the control level for the control device 400 has been set to the specific control level (S30020).

Upon receiving the response message from the first device 200, the control device 400 may be aware that the control level for the control device 400 has been set to the specific control level. Thus, the control device 400 controls operations for the first device 400 based on the set specific control level.

Using the above-defined method, the control level for the control device may be set to the specific control level based on the use environment for the controlled device and the characteristics of the control device.

According to the above-defined methods for controlling the device using Bluetooth technology, the control device may control the source device and/or the sink device.

According to the present invention, by setting the control levels for the control device differently based on the use environment for the source device and/or the sink device, the controllable operations of the source device and/or the sink device may be restricted for each control device.

Further, according to the present invention, there is an effect that it is possible to prevent errors that may occur due to different control commands from the multiple control devices by restricting the controllable operations of the source device and/or the sink device for each of the control devices.

Moreover, according to the present invention, there is also provided an effect of preventing a security issue that may occur under the control of a plurality of the control devices by restricting the controllable operations of the source device and/or the sink device for each control device.

Each of the steps described in the above embodiments may be performed by a hardware/processor. Each module/block/unit described in the above embodiments may be operated as a hardware/processor. Further, the methods proposed by the present invention may be executed using codes. The codes may be written to a storage medium readable by the processor and thus, may be read by the processor provided in the device.

For convenience of illustration, the drawings have been individually described. However, it is possible to combine the embodiments described in the respective drawings to design a new embodiment. The device and method according to the present invention are not limited to the configuration and method of the embodiments described above. Rather, all or some of the embodiments described above are selectively combined such that the embodiments may be modified.

Moreover, it is possible to implement the methods proposed by the present invention using codes readable by a processor and stored in a processor-readable storage medium, where the processor and medium may be provided in a network device. The processor-readable storage medium includes all kinds of storage devices in which data that can be read by the processor is stored. Examples of the storage medium readable by the processor include a ROM, a RAM, a CD-ROM, a magnetic tape, a floppy disk, an optical data storage device and the like. Examples of the storage medium readable by the processor may include a form of a carrier wave for transmission over the Internet. In addition, the processor-readable recording medium may be distributed over network-connected computer systems so that the codes readable by the processor may be stored and executed in a distributed fashion.

It is to be understood that while the present invention has been particularly shown and described with reference to the exemplary embodiments thereof, the invention is not limited to the disclosed exemplary embodiments. On the contrary, it will be understood by those skilled in the art that various modifications may be made without departing from the spirit and scope of the present invention.

It is understood by those skilled in the art that various variants and alternatives may be selected in the present invention without departing from the spirit or scope of the present invention. Accordingly, it is intended that the present invention covers the modifications and variations when they come within the scope of the appended claims and their equivalents.

In the present specification, a reference has been made to all the device and method inventions. In this connection, the descriptions of the device and method inventions may be applied to each other in a supplementing manner.

What is claimed is:

1. A method for controlling a first device by a control device using Bluetooth Low Energy (BLE) technology in a wireless communication system, the method comprising:
   establishing a connection with the first device via the BLE technology;
   configuring a control channel for providing an audio streaming service by controlling an isochronous channel;
   configuring the isochronous channel in a specific connection state, wherein the isochronous channel is used for transmitting and receiving audio data of the audio streaming service; and controlling a specific operation of the first device related to the audio streaming service based on a specific control level, when a control level is determined to be the specific control level, wherein the control level is information for control authority for controlling the first device, wherein the specific control level is determined based on a required security level for the first device, and wherein the specific operation is restricted based on the specific control level.

2. The method of claim 1, further comprising:

transmitting a request message to the first device requesting to set the control level of the control device to the specific control level; and receiving from the first device a response message to inform that the control level of the control device is set to the specific control level.

3. The method of claim 1, further comprising:

transmitting a request message to the first device requesting a control level of the control device; and receiving from the first device a response message to inform that the control level of the control device is set to the specific control level.

4. The method of claim 1, further comprising:

transmitting a request message to the first device requesting to set the control level of the control device to a first control level; and receiving a response message from the first device to inform that the control level of the control device is set to the specific control level, wherein the specific control level is determined based on the first control level, and wherein the specific operation according to the specific control level is an operation equal to or more restrictive than the specific operation according to the first control level.

5. A control device to control a first device using Bluetooth Low Energy (BLE) technology in a wireless communication system, the control device comprising:

a transceiver configured to communicate with the first device in a wired or wireless manner; and a processor operatively coupled to the transceiver, wherein the processor is configured to:

establish a connection with the first device via the BLE technology;

configure a control channel for providing an audio streaming service by controlling an isochronous channel;

configure the isochronous channel in a specific connection state, wherein the isochronous channel is used for transmitting and receiving audio data of the audio streaming service; and control a specific operation of the first device related to the audio streaming service based on a specific control level, when a control level is determined to be the specific control level, wherein the control level is information for control authority for controlling the first device, wherein the specific control level is determined based on a required security level for the first device, and wherein the specific operation is restricted based on the determined the specific control level.

6. The device of claim 5, wherein the processor is further configured to:

control the transceiver to transmit a request message to the first device requesting to set the control level of the control device to the specific control level; and control the transceiver to receive from the first device a response message to inform that the control level of the control device is set to the specific control level.

7. The device of claim 5, wherein the processor is further configured to:

control the transceiver to transmit a request message to the first device requesting a control level of the control device; and control the transceiver to receive from the first device a response message to inform that the control level of the control device is set to the specific control level.

8. The device of claim 5, wherein the processor is further configured to:

control the transceiver to transmit a request message to the first device requesting to set the control level of the control device to a first control level; and control the transceiver to receive from the first device a response message to inform that the control level of the control device is set to the specific control level, wherein the specific control level is determined based on the first control level, and wherein the specific operation according to the specific control level is an operation equal to or more restrictive than the specific operation according to the first control level.

* * * * *